(12) United States Patent
Abhyankar et al.

(10) Patent No.: US 12,292,858 B2
(45) Date of Patent: May 6, 2025

(54) SYSTEM AND METHOD FOR REGULAR UPDATES TO COMPUTER-FORM FILES

(71) Applicant: Citigroup Technology, Inc., New York, NY (US)

(72) Inventors: Yogesh Abhyankar, Kilchberg (CH); Manojkumar Mahantappa Paragond, Glattbrugg (CH); Miriam Silver, Herzliya (IL)

(73) Assignee: CITIGROUP TECHNOLOGY, INC., New York, NY (US)

( * ) Notice: Subject to any disclaimer, the term of this patent is extended or adjusted under 35 U.S.C. 154(b) by 0 days.

(21) Appl. No.: 18/484,136

(22) Filed: Oct. 10, 2023

(65) Prior Publication Data
US 2024/0248878 A1    Jul. 25, 2024

Related U.S. Application Data

(63) Continuation-in-part of application No. 18/238,992, filed on Aug. 28, 2023, which is a continuation of application No. 18/099,824, filed on Jan. 20, 2023, now Pat. No. 11,768,806.

(51) Int. Cl.
*G06F 16/00* (2019.01)
*G06F 16/16* (2019.01)
*G06F 16/17* (2019.01)

(52) U.S. Cl.
CPC .......... *G06F 16/16* (2019.01); *G06F 16/1734* (2019.01)

(58) Field of Classification Search
CPC ...................................................... G06F 16/16
USPC ........................................................ 707/690
See application file for complete search history.

(56) References Cited

U.S. PATENT DOCUMENTS

| | | | |
|---|---|---|---|
| 7,028,252 B1 | 4/2006 | Baru et al. | |
| 10,133,812 B2 | 11/2018 | Lee et al. | |
| 10,235,721 B1 * | 3/2019 | Cabrera | G06Q 40/123 707/707 |
| 2011/0302167 A1 | 12/2011 | Vailaya et al. | |
| 2016/0217534 A1 | 7/2016 | Goldman et al. | |
| 2017/0004518 A1 | 1/2017 | Moreau, Jr. | |
| 2020/0013036 A1 | 1/2020 | Griffith | |

(Continued)

OTHER PUBLICATIONS

International Search Report and Written Opinion on PCT App. PCT/US2024/011149 dated Mar. 4, 2024 (7 pages).

*Primary Examiner* — Alexandria Y Bromell
(74) *Attorney, Agent, or Firm* — Foley & Lardner LLP

(57) ABSTRACT

Presented herein are systems and methods for regularly updating computer-form files. A method may include obtaining, by a computer, raw data containing a plurality of data records associated with a customer from a plurality of databases, in response to detecting an error in an error data record, automatically correcting executing a machine learning architecture, the error. The method may include, for each data record, determining a data category indicating one or more computer-form files for a data entry of the data record based upon a preconfigured mapping between a type of data of the data entry mapped to the data category, and in response to detecting a new customer data requirement, updating the one or more computer-form files associated with each data category according to each data record of each daily interval, and at a preconfigured time, generating the one or more computer-form files.

20 Claims, 6 Drawing Sheets

(56) References Cited

U.S. PATENT DOCUMENTS

| | | |
|---|---|---|
| 2020/0184267 A1 | 6/2020 | Kumar |
| 2022/0318929 A1 | 10/2022 | Tavares et al. |
| 2022/0345483 A1 | 10/2022 | Shua |
| 2024/0160557 A1* | 5/2024 | Bolshakov ................ G06F 8/60 707/707 |

* cited by examiner

SYSTEM AND METHOD FOR REGULAR UPDATES TO COMPUTER-FORM FILES

CROSS-REFERENCE TO RELATED APPLICATION

This application is a continuation-in-part of U.S. application Ser. No. 18/238,992, filed Aug. 28, 2023, which is a continuation of U.S. application Ser. No. 18/099,824, now U.S. Pat. No. 11,768,806, filed Jan. 20, 2023, each of which is incorporated by reference in its entirety.

TECHNICAL FIELD

This application generally relates to managing databases for transactional data and automated generation of computer-generate form files from database records.

BACKGROUND

Tax accounting and bookkeeping is an arduous manual process which has, in recent years, been automated with the help of tax accounting software. For instance, software programs can populate forms using information provided by a user. However, there are problems with conventional tax accounting software and systems. Conventional tax accounting software requires significant user input and suffers from large computing loads when taxes are calculated.

Computer-generated form files that incorporate various types of data from a variety of data sources are often prone to errors due to the difficulty in handling large amounts of data from the different sources. Generating computer-form files using a large amount of data represents a large processing burden, leading to delays in spotting and fixing errors.

SUMMARY

A problem for servicing global banking clients is that the tax reporting obligations across different countries vary, and each of those reports can vary widely in the types of information they require. If the customer circumstances change, such as moving jurisdictions (e.g., US to Switzerland in the middle of the year), the customer's obligatory reporting requirements for that specific tax year vary, as do the rules and information needed for the report. Conventional technical solutions cannot efficiently and accurately address these complications.

What is needed is a computing system that improves upon conventional software programs and computing systems, including systems and methods that solve technical problems of high processing burdens associated with periodic generation of computer-form files, as well as the technical problems of requiring extensive user input.

Embodiments discussed herein include a system that iteratively checks the client's data daily to prepare for completion of the requisite reporting data output and confirm whether there is a need to prepare different tax reporting output(s) for the client. The system may regularly (e.g., daily) collect, extract, and consolidate necessary reporting data and prepare necessary data (e.g., automated reconciliation bank income payments, withholding taxes, custodian income payments against tax jurisdictions or regime specific governments). The system may proactively and daily manage data quality exceptions, such as errors in the reporting data. The system may develop a hierarchy of data categories based on customizable software configurations for quickly identifying and preparing the data required for dynamically identified forms (e.g., FATCA, CRS, US 1099, US 1098, US 1042-S, US 1042, FBAR, UK BBSI/OI, CA T511) according to an identified jurisdiction(s). At a preconfigured tax preparation time, the system prepares tax reportable data output using an aggregation of the processed client data from each of the previous days throughout the entire relevant timeframe, such as a user-selected timeframe or a given tax-year, thereby saving time and reducing a likelihood of errors.

The system may provide for fields and parameters for asset classification. The asset classification may include automatically determining an asset class or category for incoming data records. The asset classification may correspond to global asset classifications and other industry-wide asset classifications. The asset classification may facilitate consistent treatment of various assets or financial instruments and facilitate applying country-specific tax rules for various asset classes. In addition, the asset classification may facilitate generation of tax reference data for reporting purposes, where assets referred to differently in different jurisdictions, countries, and/or banks, are correctly classified.

The system may provide for processing of data records from multiple jurisdictions and multiple banks in a variety of formats. The data records from the multiple jurisdictions and multiple banks may be stored in a single database or separate databases in a highly configurable manner, with data stored in different databases based on user input. The databases may be configurable by bank, business area, user type, access level, geography, jurisdiction and/or tax report type. User access rules may be applied to the various databases, and forms generated using the data in the various databases, based on bank, business area, user type, access level, geography, jurisdiction and/or tax report type.

In some implementations, each phase of the system may integrate with Machine Learning components such as Machine Learning Models for Multi-Source Data Aggregation, Data Sanitization and Validation, Transaction Data Consolidation, Data Profiling and Classification, Data Integrity and Reconciliation, Real-Time Error Detection. Machine Learning components bring automation, adaptability, and continuous improvement to the system, bringing in the ability to learn from historical data and adapt to changing circumstances, resulting in more efficient, accurate, and compliant document generation.

In some implementations, the system may execute a machine learning architecture to identify issues and improve processing of data to create tax records. The machine learning architecture may learn from transaction patterns to identify common errors and exceptions, automatically fix those errors and exceptions based on machine learned prior user actions and generate necessary notifications to external applications if the information to correct the errors and exceptions is outside of the system. The machine learning architecture may monitor or keep track of rules and regulation changes and build timeframe specific tax rules, auto generate re-filings, make corrections and make one-off payments for superseded or historic tax rules. The machine learning architecture may be an advanced data analytics machine learning architecture which can process large volumes of complex data, identify hidden relationships in complex business structures, detect anomalies and manage the growing complexities of tax reports. The machine learning architecture may include proprietary algorithms to detect irregular patterns, data anomalies, uncover hidden industry trends, and identify new risks, with the ultimate goal of reducing tax evasion, fraud & potential investment opportunities. The machine learning architecture may automate and simplify data quality checks and/or error checks with a human in the loop.

The machine learning architecture may identify system performance trends and behavior trends that will allow to enhance system performance automatically and adjust server infrastructure capacity such as adding or removing cloud servers or storage. This will allow to self-manage and to minimize cost of the infrastructure for the overall system.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and together with the specification, explain the subject matter of the disclosure.

DETAILED DESCRIPTION

Figure 1:
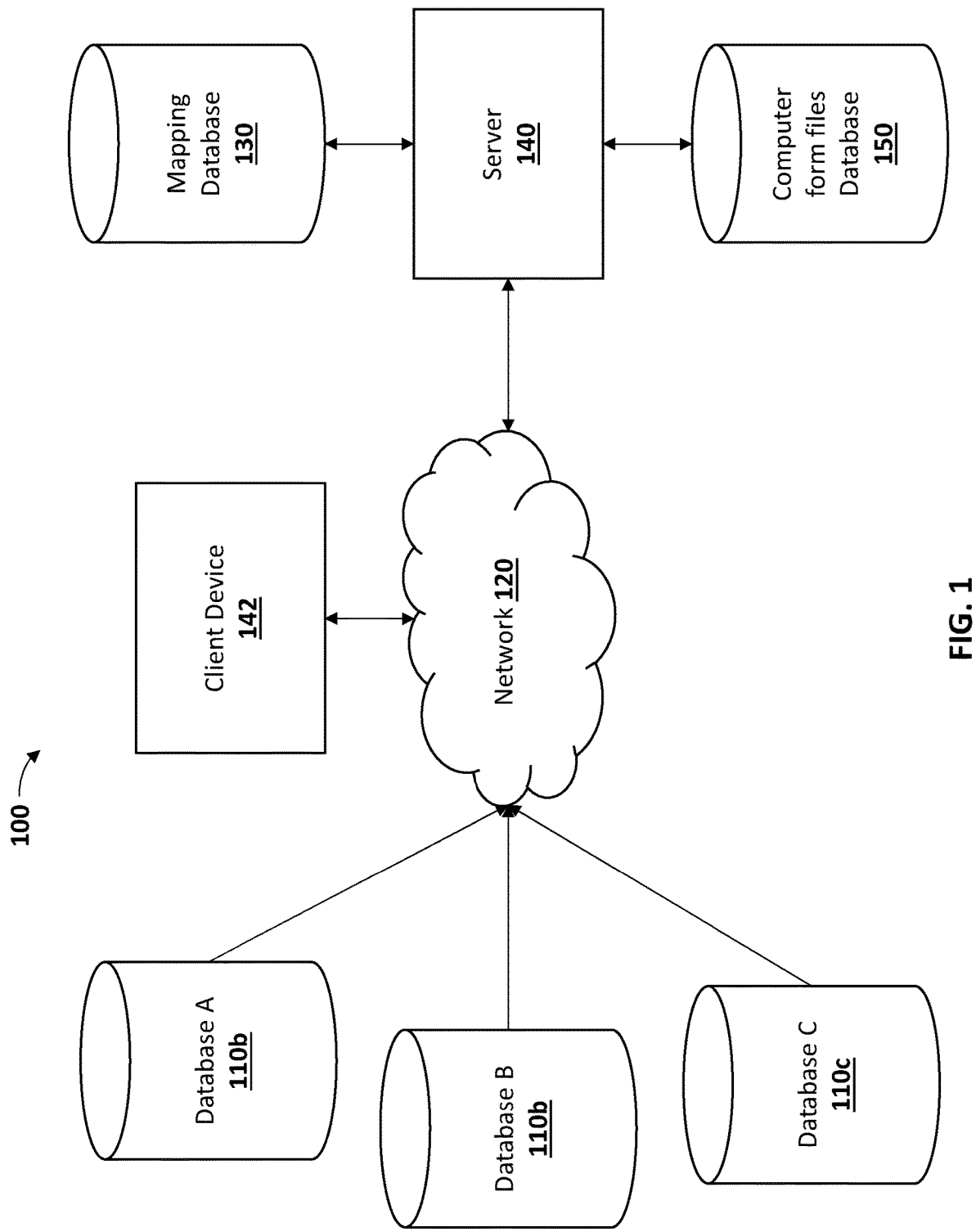
FIG. 1 is a block diagram of a network environment, in accordance with one or more embodiments.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

Current technological solutions do not include a centralized automated system, tool, or platform that performs various automated processes. Embodiments described herein include systems and methods that perform these automated processes. The system may collect various types of data based on customer reporting requirements from any number of data sources, and extract and consolidate the requisite types of data to satisfy the customer reporting requirements. The system may prepare the necessary types of data (e.g., bank income payment data, withholding taxes data, custodian income payments) based on reporting requirements (e.g., jurisdictional tax data reporting requirements). Preparing the necessary data includes performing automated daily evaluation of customer data records and reporting requirements, and, if necessary, performing reconciliation of the types of data and forms against updated reporting requirements. The system may proactively manage data quality and data quality exceptions, which may include proactively reconciling or modifying data inputs and formats according to exception management configurations, which may be entered into the system from client devices via a user interface. In operation, the system may ensure correctness and accuracy of the data to be reported and included in the computer-generated forms.

The system may run the reconciliation, updating, or modification processes on a daily basis to improve efficiency in network environment resources and end-users by imposing data quality standards a daily basis. Additionally or alternatively, the system may generate outputs containing the various types of reporting data, which may include completing or otherwise generating the computer-generate form files containing the requisite output data. For instance, the system may determine based on certain location data in the customer's data records that indicate which jurisdiction reporting requirements apply to the customer data. The system may determine certain form files (e.g., ATCA, CRS, US 1099, 1098, 1042-S (FDAP and BDI), 1042, FBAR, UK BBSI/OI (Section 17/18), Canadian T511) must be prepared on behalf of the customer. The system may generate the selected computer-generated form files using the requisite types of reporting data.

Embodiments disclosed herein generally include systems and methods for regularly (e.g., hourly, daily, weekly) evaluating and updating computer-form files using data from various data sources. Regularly evaluating and updating computer-form files solves the technical problem of high processing burdens associated with conventionally longer periods between processes for generating computer-form files. For example, generating computer-form files once a year, where the generation of the computer-form files involves processing a substantially larger number of data records (e.g., thousands of data records for a year compared to a dozen or so for a day) represents a significant processing burden. Such processing burdens prevent efficient data analysis and identification of errors in the data records. Furthermore, mass processing of data records introduces errors into the processing of the data records, resulting in errors in the computer-form files. Regularly updating computer-form files represents a technical solution to the problem of high processing burdens due to periodic generation of the computer-form files.

Furthermore, automatic categorization of the data records solves the technical problem of assigning the data records to the computer-form files for generating the computer-form files. The data records may include data records of various types having various parameters. Categorizing the data records based on various different types of data records and/or parameters of data records may prevent errors in assigning data records to computer-form files, reducing the processing burden associated with generating the computer-form files. Conventional systems require significant user input for determining how data records should be assigned to various computer-form files. Automatic categorization of the data records for regularly updating computer-form files represents an improvement in the field of generating computer-form files.

Furthermore, automatic categorization of the data records may be used to detect new customer data requirements. New customer data requirements may be caused by one or more events, which may be automatically detected based on the automatic categorization of the data records. The new customer data requirements may require the addition, deletion, or modification of one or more computer-form files from a list of computer-form files to be generated. The addition, deletion, or modification of one or more computer-form files form the list of computer-form files to be generated may cause a cascade of alterations or modifications in the assignment of data records to the computer-form files. Regularly updating the computer-form files and the accompanying updating of the list of the computer-form files to be generated as informed by the automatically detected events may prevent errors caused by erroneous assignment of data records to computer-form files. In this manner, the processing burden and time required to generate the computer-form files may be decreased. This improves the function of a computer used to generate the computer-form files and represents an improvement to the field of generating computer-form files.

FIG. 1 is a block diagram of a network environment 100, in accordance with one or more embodiments. The environment 100 may include database A 110a, database B 110b, and database C 110c, referred to collectively as databases 110. The databases 110 may be in communication with a server 140 via a network 120. The network 120 may be a WAN, such as the internet, or any kind of network. The server 140 may be in communication with a mapping database 130 and a computer-form files database 150. The server 140 may receive data records from the databases 110, a mapping from the mapping database 130, and computer-form files from the computer-form files database 150.

The data records may include demographic data, entity data, transaction data, and other kinds or types of data. Data types may be defined based on other data entries associated with a particular data entry and/or parameters of the particular data entry including a source of the particular data record, a custodian of the particular data record, and other parameters. Each data entry may be associated with one data type. Each data entry may be associated with multiple data types. In some implementations, a first data entry of a data record is associated with a first data type and a second data entry of a data record is associated with a second data type.

The server 140 includes any computing device comprising hardware and software components capable of performing the various processes described herein. Non-limiting examples of the server 140 include a server computer, workstation computer, tablet computer, and the like. The server 140 receives the various types of data from the databases 110 and/or computer-form files database 150, and performs various operations including categorizing the received data from the databases 110 using data mappings stored in the mapping database 130 or generated by the server 140; detecting a new customer data requirement based on the received data; updating the computer-form files from the computer-form files database 150; and, at a preconfigured time, generating the one or more computer-form files based on the categorized data.

The server 140 receives the data records at regular preconfigured intervals (e.g., daily, weekly) or continuously. Using the data records, the server 140 categorizes data entries of the data records at the preconfigured interval or continuously. The server 140 categorizes the data entries of the data records according to, for example, a data type, or types of data entries and/or data records. The server 140 may determine an asset classification corresponding to each data record at the preconfigured interval or continuously.

The regular interval may be any short-term timeframe in which the server 140 can categorize the data entries of the data records received during the timeframe. For example, the regular interval may be daily if the server 140 can categorize the data entries of the data records for a given day so as to avoid CPU bottlenecking. In some cases, the regular interval may be adjusted dynamically based on the number of data records received and the processing resources of the server 140. In this way, the server 140 avoids delays caused by CPU bottlenecking due to attempting to process large amounts of data. Further, the server 140 may categorize the data entries of the data records without visible delay, allowing for detection and correction of errors.

The server 140 may categorize the data entries into data categories based on a preconfigured mapping between data types and the data categories. The server 140 may use the mapping from the mapping database 130 to determine one or more data categories for each data entry based on the data type or data types associated with each data entry. For example, the server 140 may categorize a transaction data entry as income-based data based on determining that the type of transaction data entry indicates a receipt of income funds. The server 140 may apply the mapping to each data entry to determine the data category for each data entry. In some cases, the mapping specifies one or more data categories for each data type. In some cases, the mapping specifies a data category for each data entry based on multiple data types of the data entry. For example, the server 140 categorizes a transaction as a transfer based on a first type of the transaction being a receipt of funds and a second type of the transaction being a transfer of funds. The data categories may correspond to or indicate computer-form files. For example, a data category of income may correspond to one or more tax forms for reporting income.

The server 140 may analyze the data records to detect new customer data requirements. In some implementations, the server 140 may detect the new customer data requirements by determining that a data category of a data entry of a data record indicates a computer-form file not included in a list of computer-form files. In some implementations, the server 140 may detect the new customer data requirements based on a change in data records received, a data record indicating a new customer data requirement, and/or a combination of data records. For example, the server may receive data records associated with a new address of a customer, where the new address is located in a jurisdiction requiring the new customer data requirement (e.g., new data types, new computer-form files). In another example, the server may receive data records associated with a new entity associated with a customer, where the new data requirement includes information associated with the new entity.

The server 140 updates the one or more computer-form files associated with each data category based on detecting the new customer data requirements. The server 140 may update the one or more computer-form files by retrieving additional computer-form files from the computer-form files database 150. The server 140 may update the one or more computer-form files by retrieving updated computer-form files from the computer-form files database 150. In some implementations, updating the one or more computer-form files includes updating the categories used for categorizing the data records.

The databases 110 may be located in various different jurisdictions and/or contain types of data relevant to particular jurisdictions. For example, database A 110b may be located in a first jurisdiction, database B 110b may be located in a second jurisdiction, and database C 110c may be located in a third jurisdiction. The data records from the databases 110 may be tagged with or include a parameter indicating from which jurisdiction and/or from which database the server 140 receives the data records. In some implementations, the data records and or the data entries of the data records may differ in format based on from which database and/or jurisdiction the server 140 receives the data records. The data records may include transaction data. The databases 110 may be associated with various different entities. The databases 110 may include transaction data for the various different entities. In some implementations, the database A 110*a* may include demographic information of a customer, including place of residence, citizenship, and other demographic information. In some implementations, each respective data record may include a first data entry representing demographic information and a second data entry representing transaction data. The demographic information may be received by the server 140. The demographic information may affect the categorization of the data records and/or the list of computer-form files updated by the server 140.

The databases 110 may include data records from multiple jurisdictions and multiple banks. Data records from different jurisdictions and/or banks may have a variety of formats. The data records from the multiple jurisdictions and/or multiple banks may be stored in a single database of the databases 110 or in separate databases of the databases 110. User input may be used to configure the storage of the data records in the databases 110. In an example, user input may be used to store data records from different banks in different databases of the databases 110. In an example, user input may be used to store data records from different jurisdictions in different databases of the databases 110. Storage of the data records may be highly configurable, with data records stored in different databases based on bank, business area, user type, access level, geography, jurisdiction and/or tax report type. In an example, the server 140 may instruct the databases 110 to store data records from a specific bank in separate databases based on jurisdiction. User access rules may be applied to the databases 110, and the computer-form files generated using the data in the databases 110, based on bank, business area, user type, access level, geography, jurisdiction and/or tax report type. In this way, user input can be used to configure access to the data records and computer-form files by configuring storage of the data records in the databases 110 and/or configuring access to the databases 110.

The system 100 may include a client device 142. The client device 142 may be any device including a memory and a processor capable of communicating, via the network 120 with the server 140. The client device 142 may allow a user, via a user interface, to add, remove, and/or edit configurations of the server 140. In some implementations, the configurations may modify the mapping, the data categories, and/or the one or more computer-form files. For example, the user may, via the user interface, modify the mapping of a particular data type to a particular data category based on an update to a particular computer-form file. In another example, the user may, via the user interface, modify the mapping of dividend income from short-term gains to long-term gains based on an update to a tax form for reporting dividend income. In some implementations, the configurations may modify the generation of the one or more computer-form files based on the categorized data entries. For example, a configuration may include one or more algorithms for generating the one or more computer-form files based on the categorized data entries. The user may, via the user interface, add or remove one or more databases of the databases 110. The user may, via the user interface, add or remove intended recipients of the one or more computer-form files. For example, the user may add or remove jurisdictions for reporting tax forms.

The server 140 may automatically detect and correct errors in the data records. In some implementations, the server 140 may automatically detect the errors in the data records by reconciling the data records against data configurations associated with the computer-file forms. For example, the server 140 may automatically perform reconciliation of bank income payments, withholding taxes, custodian income payments, etc. against tax jurisdiction or government-specific regulations associated with tax forms. The server may automatically correct the errors in the data records. For example, the server interface may provide automatic preemptive reconciliation and exception management via the user interface. The server may generate an alert on the user interface of the client device 142 to correct the errors. The server may request additional data records from the databases 110 to correct the errors. The server may iteratively correct the errors until no errors remain. The server 140 may determine that a rule set including one or more rules applied to detect errors is deficient. The server 140 may generate jurisdiction or regime-specific rules to cover asset classes or financial products not covered in the rule set. The server 140 may prompt a user to update the rule set or automatically update the rule set. In some implementations, the server 140 automatically update the rule set and present the updated rule set to the user for verification.

In some implementations, the system 100 may provide for fields and parameters for asset classification. The fields and parameters for asset classification may be determined based on a database of the databases 110 from which data records originate. In an example, a data record may be classified as being associated with an asset class based at least in part on the data record originating from a specific database of the databases 110. In some implementations, the asset classification may be based on existing fields and parameters of the data records. In some implementations, the fields and parameters for asset classification may be determined by the server 140. The server 140 may determine, based on parameters of the data records, an asset class and/or asset category for each data record.

In some implementations, the asset classification may correspond to global asset classifications and other industry-wide asset classifications. The asset classification may facilitate consistent treatment of various assets or financial instruments and facilitate applying country-specific tax rules for various asset classes. In addition, the asset classification may facilitate generation of tax reference data for reporting purposes, where assets referred to differently in different jurisdictions, countries, and/or banks, are correctly classified. In some implementations, determining the asset classification includes applying a classification hierarchy to the data record. In an example, the classification hierarchy may provide multiple levels of asset classifications to a data record, such as stock, dividend-yielding stock, and Class A share.

In some implementations, the classification hierarchy is based on tax reporting rules. The classification hierarchy may include classes of taxable assets. The classification hierarchy may be organized according to tax treatment of different assets. The asset classification may correspond to a taxable class of assets. In some implementations, the asset classification includes a specific asset identifier. In some implementations, the asset classification includes a specific tax treatment identifier. In an example, the asset classification corresponds to a dividend-bearing stock. In an example, the asset classification corresponds to a cash dividend.

In some implementations, applying the classification hierarchy to the data records or to each data record includes applying a decision tree corresponding to the classification hierarchy. The decision tree may include multiple hierarchical levels which each classify assets and/or data records into more specific asset classifications. The decision tree may include more or fewer levels than are utilized by the server 140. In an example, the decision tree includes seven levels and the server 140 applies the asset classification using the first five levels of the decision tree. In an example, the decision tree includes seven levels and the server 140 applies the asset classification using the seven levels of the decision tree and then further refines the classification of various assets beyond the classifications provided by the decision tree. The server 140 may apply multiple decision trees to the data records to determine the asset classification for each data record. The server 140 may compare multiple asset classifications generated using the multiple decision trees to determine the asset classification for each data record.

In some implementations, the server 140 updates the classification hierarchy based on user input. The user input may include changes to the classification hierarchy. The user input may reflect changes to rules or regulations affecting the classification of assets and/or the tax treatment of various assets. The user input may include a request for the server 140 to obtain data corresponding to the classification hierarchy to update the classification hierarchy. In an example, the user input includes a request for the server 140 to retrieve a published asset classification to update the classification hierarchy and/or the decision tree used by the server 140. In some implementations, the classification hierarchy includes a mapping of multiple asset names to a unified asset classification. In an example, data records may be labeled as being associated with various assets having different names in different banks or jurisdictions and the classification hierarchy translates the different asset names into asset names in the unified asset classification. In an example, the classification hierarchy maps multiple different asset names from different jurisdictions to a single asset name in the unified asset classification. In this way, the classification hierarchy represents a unified data model for translating various asset names into asset names of a unified asset nameset. In some implementations, the classification hierarchy translates asset names between different languages. In some implementations, the classification hierarchy translates asset names between different customary asset names, different jurisdictional asset names, and/or different institutional names and the unified asset classification.

In some implementations, the type of the data entry includes the asset classification of the data record. The data entry may inherit the asset classification of the corresponding data record. The asset classification may aid in mapping the data entry to the data category. In an example, a data entry corresponding to a stock dividend may be mapped to a taxable income category based at least in part on the data entry having a stock dividend asset classification. The server 140 may determine the type of the data entry of the data entry based at least in part on the asset classification of the corresponding data record.

In some implementations, determining the asset classification includes applying a classification machine learning infrastructure on the data record and/or the plurality of data records. The classification machine learning infrastructure may be trained using classifications of various assets, the classification hierarchy, various decision trees, and/or user input regarding classification of assets. In some implementations, the classification machine learning infrastructure may be trained using a first dataset including assets and their classifications in a first round of training and then trained using a second dataset including assets that were incorrectly classified in a second round of training. In this way, the classification machine learning infrastructure may be trained based on its past mistakes to improve a quality of its classifications. The classification machine learning infrastructure may also be trained using an adversarial process where a classification verification machine learning infrastructure is pitted against the classification machine learning infrastructure until the classification machine learning infrastructure is capable of producing classifications which the classification machine learning infrastructure identifies as ground truth.

In some implementations, determining the asset classification includes identifying an origin of the data record. The origin of the data record may include a jurisdiction, a bank, and/or a database of the databases 110. As discussed herein, the database in which the data record is stored and/or from which the data record originates may correspond to a jurisdiction and/or bank. Different data records having a same original asset name may be classified as different assets based on origins of the different data records. In an example, a first data record having an original asset classification as personal property may be classified as personal property and a second data record having an original asset classification as personal property may be classified as corporate property based on different definitions of personal property and corporate property in different jurisdictions. In an example, a data record may be classified based on a specific bank labeling assets with bank-specific asset names. In this example, the classification hierarchy may include a mapping between the bank-specific asset names and the unified asset classification.

In some implementations, the server 140 may modify the one or more computer-form files using the asset classification of each data record. The server 140 may modify the one or more computer-form files using the asset classifications of each data record. The server 140 may modify the one or more computer-form files based on an updated ruleset and/or updated regulations related to the one or more computer-form files and the asset classifications of the data records used to generate the one or more computer-form files. In an example, the server 140 modifies the one or more computer-form files to reflect a new tax treatment of one or more asset classes. The server 140 may modify the one or more computer-form files based on an update to the classification hierarchy and/or an update to the mapping of asset classifications. In an example, the server 140 may modify the one or more computer-files based on an update to a mapping between bank-specific asset names and the unified asset classification.

The server 140 generates a report based on the categorized data entries. The server 140 may generate the report at a predetermined time, such as at a tax preparation time. The server 140 may generate the report in response to user input via the user interface. The report may include the one or more computer-form files, generated using the categorized data entries. For example, the report output data may include computer-fillable files representing tax forms (e.g., FATCA, CRS, US 1099, US 1098, US 1042S (FDP and BDI), US 1042, US FBAR, UK BBSI/OI (Section 17/18), CA T511) relative to a given jurisdiction that the server 140 determines are relevant to the customer. The user may, via the user interface of the client device 142, add or remove a computer-form file from the report. The user may, via the user interface of the client device 142, add or remove a set of computer-form files from the report. For example, the user may, via the user interface, add or remove tax forms associated with jurisdictions from the report.

Figure 2:
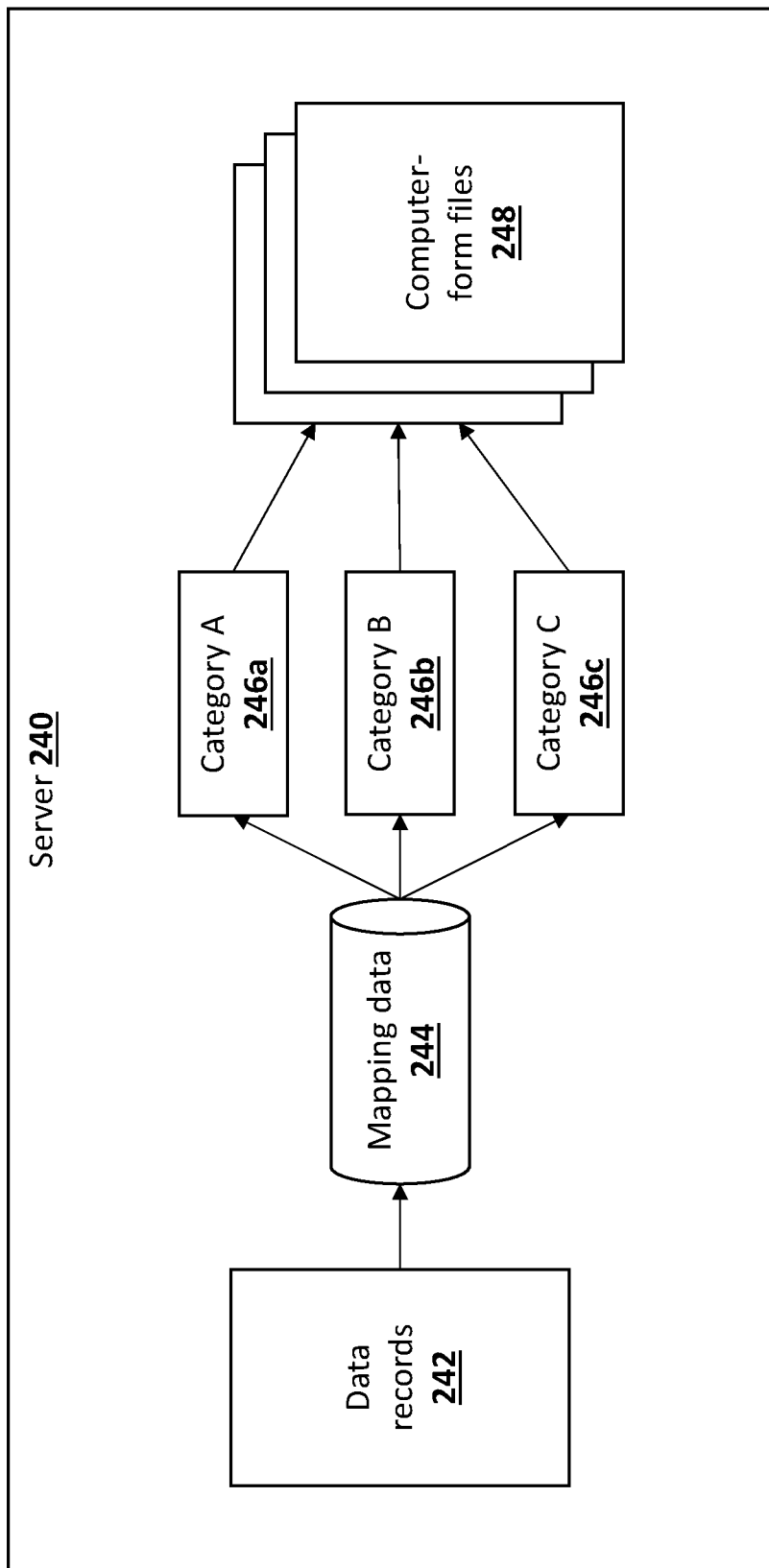
FIG. 2 is a block diagram of a server, in accordance with one or more environments, in accordance with one or more embodiments.

FIG. 2 is a block diagram of a server 240, in accordance with one or more environments. The server 240 may be the server 140 of FIG. 1. The server 240 may include data records 242. The server 240 may receive the data records 242 from a plurality of databases, such as the databases 110 of FIG. 1. The server 240 may include mapping data 244. The server 240 may receive the mapping data 244 from a mapping database such as the mapping database 130 of FIG. 1. The server 240 may include computer-form files 248. The server 240 may receive the computer-form files 248 from a computer-form files database, such as the computer-form files database 150 of FIG. 1.

The server 240 may categorize data entries of the data records 242, or determine a data category for each data entry of the data records 242. The server 240 may include a category A 246a, a category B 246b, and a category C 246c, referred to collectively as categories 246. In some implementations, the categories 246 may be a plurality of categories.

The server 240 may determine a category for each of the data entries of the data records 242 by applying the mapping data 244 to the data entries. The mapping data 244 may be a preconfigured mapping between data types of the data entries and the categories 246. For example, the mapping data 244 may map funds received to an income category. The server may categorize the data entries based on a source of the data records and/or a custodian of the data records. For example, the mapping data 244 may map funds received to a transfers category based on the funds being sent from a first account of a customer to a second account of a customer. In some implementations, the server 240 may determine the data types of the data entries to apply the mapping data 244 to the data entries. In some implementations, the server 240 may use the mapping data 244 to determine the data types of the data entries and the categories 246 corresponding to the data types to categorize the data entries. The server 240 may receive the data records 242 at a daily interval and categorize the data entries of the data records 242 at the daily interval. In this way, the server 240 may avoid CPU-bottlenecking caused by categorizing more than an efficient, manageable, daily amount of the data entries of the data records 242 at one time.

The categories 246 may be organized hierarchically. The category A 246a may include the category B 246b such that all data entries mapped to the category B 246b are also mapped to the category A 246a. For example, a category "US transactions" may include a category "US income" such that all data entries mapped to the category "US income" are also mapped to the category "US transactions." The hierarchy of categories may include any number of levels. In some implementations, the server 240 may determine categories for the data entries iteratively, per level of the hierarchy of categories.

The server 240 applies the categorized data entries to the computer-form files. The server 240 may apply the categorized data entries to populate one or more fields of the computer-form files. In some implementations, the server 240 may apply a first subset of the data entries corresponding to the category A 246a to populate a first subset of fields of one or more computer-form files 248 and the server 240 may apply a second subset of the data entries corresponding to the category B 246b to populate a second subset of fields of the one or more computer-form files 248. For example, demographic information corresponding to a first category may be used to populate first fields of a particular computer-form file and transaction information corresponding to a second category may be used to populate second fields of the particular computer-form file. In some implementations, the server 240 may apply the categorized data entries to the computer-form files 248 when the computer-form files 248 are generated. For example, the server 240 may store the categorized data entries and a list of the computer-form files 248 and, at a preconfigured time, or based on user input, generate the computer-form files 248 based on the categorized data entries. In some implementations, the server 240 may regularly apply the categorized data entries to the computer-form files 248, such as daily.

The categories 246 may each correspond to the computer-form files 248 on a one-to-one basis. For example, the category A 246a may correspond to a first computer-form file of the computer-form files 248 and the category B 246b may correspond to a second computer-form file of the computer-form files 248. The categories 246 may correspond to different portions or fields of the computer-form files 248. The server 240 may determine one category of the categories 246 for each data entry. The server 240 may determine multiple categories of the categories 246 for one or more data entries of the data records 242. The server 240 may split a data record of the data records 242 into a first sub-record and a second sub-record and assign the data entries of the first sub-record to the category A 246a and the data entries of the second sub-record to the category B 246b.

The server 240 may update the computer-form files based on detecting a new customer data requirement. In some implementations, the server 240 may detect the new customer data requirement based on the mapping data 244. The mapping data 244 may map one or more data entries of the data records 242 to the category C 246c corresponding to a missing computer-form file not found in the computer-form files 248. The server 240 may determine that the one or more data entries of the data records 242 represent a new customer data requirement. The server 240 may update the computer-form files 248 to include the missing computer-form file. The server 240 may detect the new customer data requirement based on the data records 242 received in a time period, such as a day. The server 240 may update the computer-form files 248 such that the data entries received in a subsequent time period, such as a subsequent day, may be categorized according to the categories 246 and the corresponding computer-form files 248. By detecting new customer data requirements based on daily data records 242 and updating the computer-form files 248 accordingly, the server 240 avoids incorrectly categorizing the data entries, failing to categorize the data entries, or experiencing CPU bottlenecking due to attempting to categorize more than a daily amount of the data entries at one time.

Figure 3:
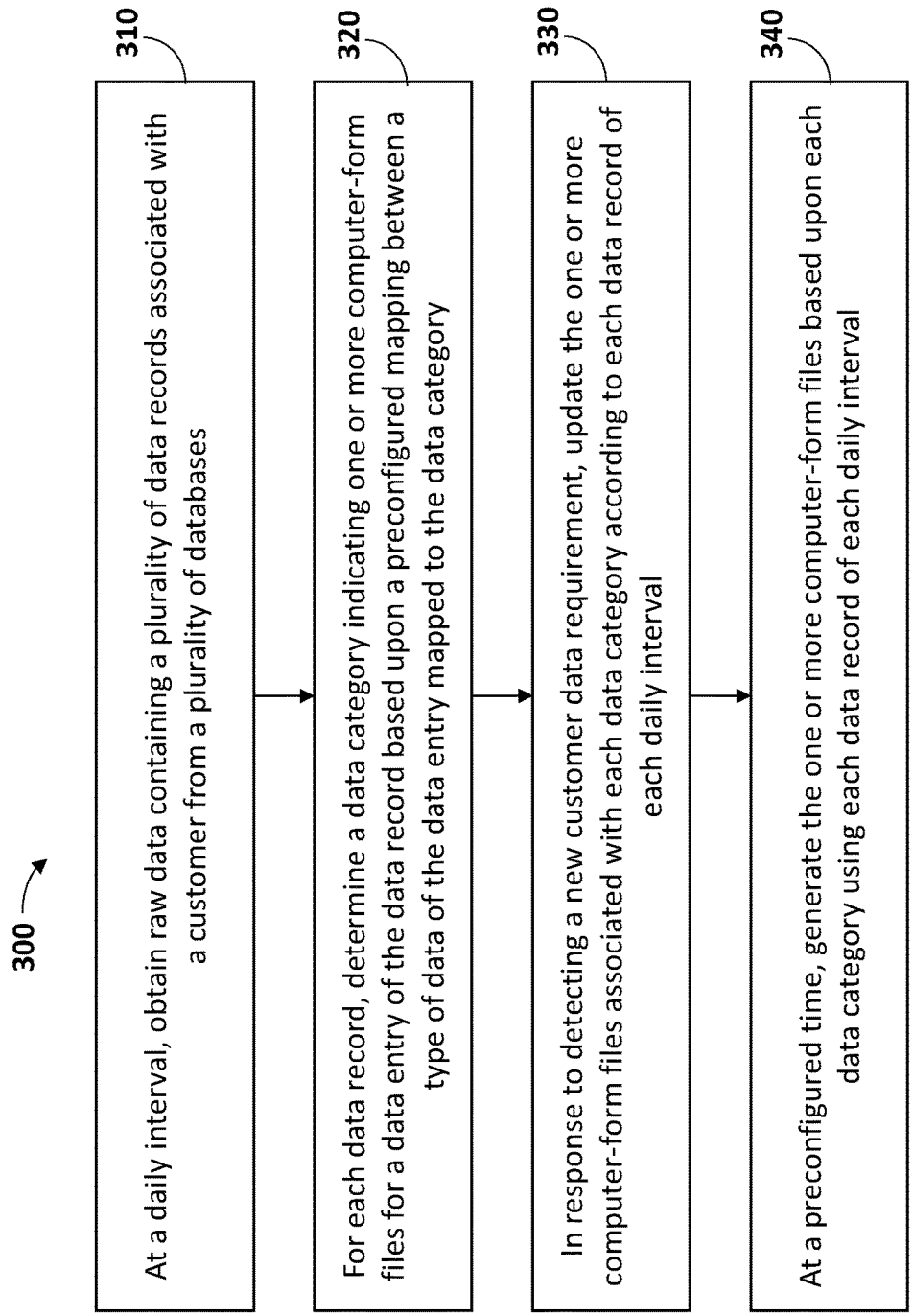
FIG. 3 is a flow chart illustrating operations of a method for updating computer-form files, in accordance with one or more embodiments.

FIG. 3 is a flow chart illustrating operations in a method 300 for updating computer-form files. The method 300 may include more or fewer operations than shown. The operations shown may be performed in the order shown, in a different order, or concurrently. The method 300 may be performed by the server 140 of FIG. 1 or the server 240 of FIG. 2.

At operation 310, a server, at a daily interval, obtains raw data containing a plurality of data records associated with a customer from a plurality of databases. The plurality of data records includes a plurality of data entries. The data entries may include various data types. For example, a first data entry may be demographic information and a second data entry may be transaction data. The server can identify, parse, or categorize data entries as indicated by data type. Obtaining the raw data at a daily interval offers the technical advantage of reducing a processing burden on the server associated with receiving and categorizing the data records.

At operation 320, the server, for each data record, determines a data category indicating one or more computer-form files for a data entry of the data record based upon a preconfigured mapping between a type of data of the data entry mapped to the data category. In some cases, the server determines the type of data or data type of the data entry in order to map the data entry to a data category. The server may apply the mapping data to determine the type of data of the data entry and maps the type of data to the data category. For example, the mapping data may include a mapping between data formats and data types as well as a mapping between data types and data categories.

In some implementations, the server determines the type of data of the data entry based on an indication in the data record of the type of data. For example, the data record may be marked or tagged as including income or transfer transactions. In some implementations, the data category includes or corresponds to a recipient of a subset of the one or more computer-form files. For example, the subset of the one or more computer-form files may be intended for the recipient and the data category may indicate the recipient of the subset of the one or more computer-form files.

In operation, the server may determine the data category for the data entry by requesting, from one or more databases of the plurality of databases, additional information associated with the data entry and/or the data record of the data entry. For example, an incomplete data entry or data record may require requesting a corrected data entry or a corrected data record from the plurality of databases. Machine learning models can be applied to recognize patterns, commonalities, and anomalies among disparate sources. In this case machine learning enhances the accuracy of data consolidation and aids in detecting potential discrepancies. In another example, an incorrect data entry or data record may require requesting a corrected data entry or a corrected data record from the plurality of databases. Beneficially, receiving and processing data records on a daily interval prevents or mitigates CPU bottlenecking and/or network bottlenecking caused by categorizing a large number of data records and/or requesting a large number of corrected data entries and/or data records from the plurality of databases.

In some implementations, machine learning models can be applied to automatically identify one or more databases of the plurality of databases as most relevant to specific mapping, or additional information requirements, and prioritize them based on historical usage patterns. This not only reduces manual or rule-based automatic effort but also improves the speed and accuracy of data acquisition by continually learning from past interactions. Furthermore, Machine Learning may applied for Data Sanitization and Validation by employing algorithms that can detect anomalies, outliers, and errors in the extracted data, ensuring that only high-quality information is used for document generation.

In some implementations, the server splits a data entry into a first sub-entry and a second sub-entry based on the data entry being mapped to a particular data category in the preconfigured mapping, wherein the first sub-entry is mapped to a first data category and the second sub-record is mapped to a second data category in the preconfigured mapping. In some implementations, the first sub-entry and the second sub-entry are the same. In some implementations, the first sub-entry and the second sub-entry are different. In an example, a transaction is copied to be applied to a first computer-form file in a first format and applied to a second computer-form file in a second format. In another example, a first portion of a transaction is mapped to a first category and a second portion of a transaction is mapped to a second category.

In some implementations, machine learning models can be employed for Transaction Data Consolidation. Machine learning through the use of clustering and pattern recognition techniques, can help to identify and merge similar transactions across various sources, thereby improving the overall quality and consistency of the data.

At operation 330, the server, in response to detecting a new customer data requirement, updates the one or more computer-form files associated with each data category according to each data record of each daily interval. The server may detect the new customer data requirement by comparing the one or more computer-form files to a list of active computer-form files and determining that the one or more computer-form files are not present in the list of active computer-form files. In some implementations, the server generates an alert in response to detecting the new customer data requirement. For example, the server may send a notification to a user to notify the user and/or customer that a new customer data requirement has been detected. The user and/or customer may verify the new customer data requirement.

In some implementations, Machine Learning can be applied for Customer Data Profiling and applying recommendations for processing new customer data requirement. Customer Data Profiling leverages machine learning models such as customer segmentation algorithms and predictive analytics. These models analyze historical customer behaviors, transaction patterns, and preferences to create comprehensive customer profiles. Machine learning continuously updates these profiles as new data becomes available, providing a deep understanding of each customer's data characteristics. In Transaction Categorization, machine learning techniques such as natural language processing (NLP) and neural networks are used to automatically classify transactions into relevant categories. By training these models on large datasets of labeled transactions, they become adept at recognizing transaction types and improving the accuracy of customer data classification.

At operation 340, the server, at a preconfigured time, generates the one or more computer-form files based upon each data category using each data record of each daily interval. The server references the data records containing the categorized data entries to generate the one or more computer-form files at the preconfigured time. For example, the server may generate a computer-form file associated with income using data entries categorized as income in the data records. The server may generate the one or more computer-form files and regularly (e.g., daily) evaluates and, if needed, modifies the one or more computer-form files being used or data field(s) of the one or more computer-form files, based on the categorized data entries or changes to the data entries.

The server may, in response to a user input, completes the data fields, or otherwise generates, the one or more computer-form files based upon each data category using each data record, as evaluated each daily interval. A user may generate the computer-form files at any time to view the computer-form files generated using the data records, allowing the user to verify the accuracy of the computer-form files. This is made possible by daily categorization of the data entries of the data records and represents an improvement in the field of computer-form file generation.

In some implementations, the server updates a report based on the categorized data entries of the plurality of data records and verifies, at the preconfigured time, the one or more computer-form files using the report. In an example, the report may represent an aggregation of data entries which are used to generate the one or more computer-form files and the report may be used to verify an accuracy of generating the one or more computer-form files.

Figure 4:
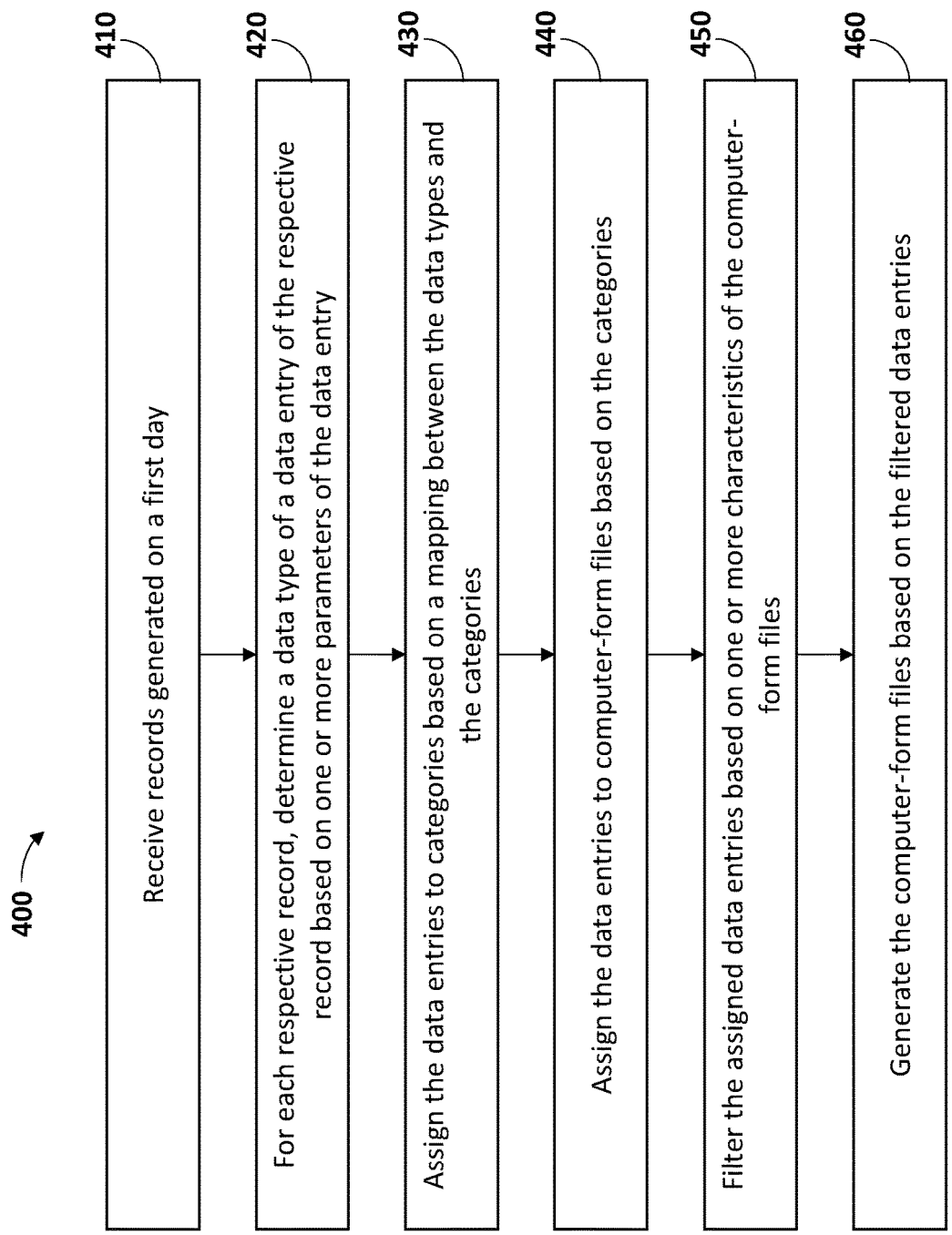
FIG. 4 is a flow chart illustrating operations of a method for updating computer-form files, in accordance with one or more embodiments.

FIG. 4 is another flowchart 400 illustrating operations for updating computer-form files. The method 400 may include more or fewer operations than shown. The operations shown may be performed in the order shown, in a different order, or concurrently. The method 400 may be performed by the server 140 of FIG. 1 or the server 240 of FIG. 2.

At operation 410, a server receives records generated on a first day. The server may receive the records from a plurality of databases. The records may include demographic information and/or transaction information. Each of the records may include a plurality of data entries, where each data entry has a data type. Receiving records generated on a first day reduces the computing resources required to receive and process the records, reducing CPU bottlenecking.

At operation 420, the server, for each respective record, determines a data entry type of a data entry of the respective record based on one or more parameters of the data entry. The server may determine the data entry type based on one or more parameters of the data entry. The server may determine the data entry type based on one or more related data entries. The server may determine the data entry type based on one or more parameters of the respective record. The server may determine the data entry type based on any combination of the above.

At operation 430, the server assigns the data entries to categories based on a mapping between the data types and the categories. In some implementations, the server maintains a data structure for each respective category within which the data entries corresponding to the respective category are stored. In some implementations, the server tags the data entries with a tag corresponding to the categories to which the data entries are assigned. In some implementations, the server generates an indexed ledger indicating which data entries are assigned to which categories.

At operation 440, the server assigns the data entries to computer-form files based on the categories. The server assigns the data entries based on configurations indicating the particular computer-form files. In some implementations, the server maintains a preliminary version of each computer-form file of the computer-form files and incorporates the data entries into their assigned computer-form files. In some implementations, the server tags the data entries with a tag corresponding to the computer-form files. Additionally or alternatively, the server generates an indexed ledger indicating which data entries are assigned to which computer-form files.

At operation 450, the server filters the assigned data entries based on one or more characteristics of the computer-form files. The server may filter the data entries such that a data entry may be used in generating a first computer-form file to which the data entry is assigned and not used in generating a second computer-form file to which the data entry is assigned. The server may mark filtered data entries as not to be used in generating a particular computer-form file. In other implementations, the server does not incorporate the filtered data entries into a preliminary version of the particular computer-form file. In operation, the server filters data entries assigned to a particular computer-form file based on the particular computer-form file being associated with an entity which requires inclusion of some data entries, but not other data entries in the computer-form file.

As an example, transactions associated with mortgage interest payments may be included in US tax forms, but not UK tax forms. The mortgage interest payment transactions may be assigned to the UK tax forms based on their category, but filtered out so they are not used in generating the UK tax forms. In another example, the server receives records associated with relocation of a customer from a first address to a second address, where the second address is associated with different computer-form files than the first address. Subsequent transactions required by the computer-form files associated with the first address but not required by the computer-form files associated with the second address are filtered out, such that they are not used in generating the computer-form files associated with the second address.

At operation 460, the server generates the computer-form files based on the filtered data entries. The server may generate the computer-form files using only the data entries that are not filtered-out by the server for each computer-form file. The server may update previously generated computer-form files based on the filtered data entries.

Figure 5:
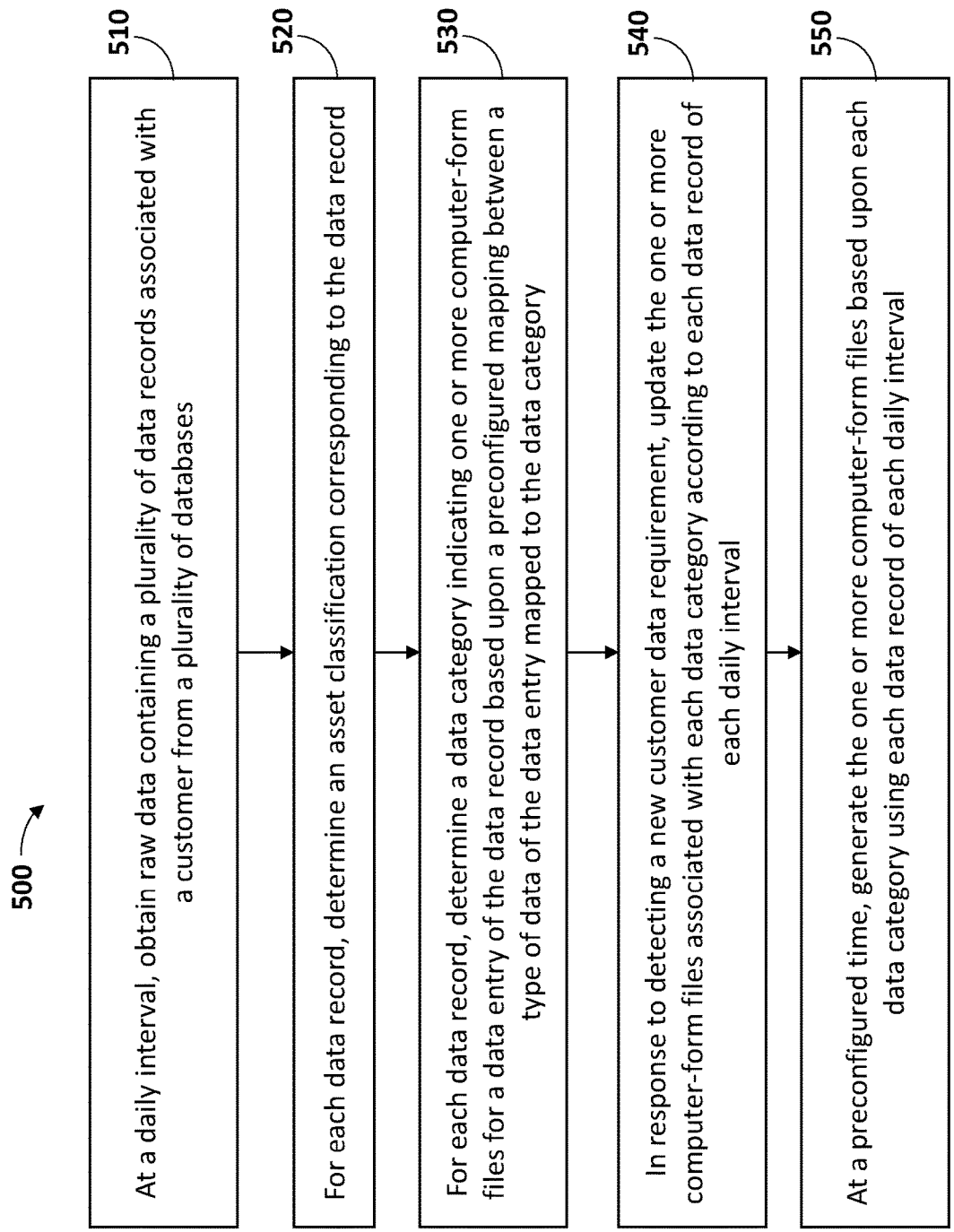
FIG. 5 is a flow chart illustrating operations of a method for determining asset classifications and updating computer-form files, in accordance with one or more embodiments.

FIG. 5 is a flow chart illustrating operations of a method for determining asset classifications and updating computer-form files, in accordance with one or more embodiments. The method 500 may include more or fewer operations than shown. The operations shown may be performed in the order shown, in a different order, or concurrently. The method 300 may be performed by the server 140 of FIG. 1 or the server 240 of FIG. 2.

At operation 510, a server, at a daily interval, obtains raw data containing a plurality of data records associated with a customer from a plurality of databases. The plurality of data records includes a plurality of data entries. The data entries may include various data types. For example, a first data entry may be demographic information and a second data entry may be transaction data. The server can identify, parse, or categorize data entries as indicated by data type. Obtaining the raw data at a daily interval offers the technical advantage of reducing a processing burden on the server associated with receiving and categorizing the data records.

At operation 520, the server, for each data record, determines an asset classification corresponding to the data record. In some implementations, determining the asset classification may include applying a classification hierarchy to the data record. In some implementations, the classification hierarchy may be based on tax reporting rules, and wherein the asset classification corresponds to a taxable class of assets. In some implementations, applying the classification hierarchy to the data record may include applying a decision tree corresponding to the classification hierarchy. Operation 520 may include updating, the classification hierarchy based on user input. In some implementations, the classification hierarchy may include a mapping of multiple asset names to a unified asset classification. In some implementations, the type of the data entry may include the asset classification of the data record. In some implementations, determining the asset classification may include applying a machine learning infrastructure on the data record. In some implementations, determining the asset classification may include identifying an origin of the data record. Operation 520 may include modifying the one or more computer-form files using the asset classifications of each data record.

At operation 530, the server, for each data record, determines a data category indicating one or more computer-form files for a data entry of the data record based upon a preconfigured mapping between a type of data of the data entry mapped to the data category. In some cases, the server determines the type of data or data type of the data entry in order to map the data entry to a data category. The server may apply the mapping data to determine the type of data of the data entry and maps the type of data to the data category. For example, the mapping data may include a mapping between data formats and data types as well as a mapping between data types and data categories.

In some implementations, the server determines the type of data of the data entry based on an indication in the data record of the type of data. For example, the data record may be marked or tagged as including income or transfer transactions. In some implementations, the data category includes or corresponds to a recipient of a subset of the one or more computer-form files. For example, the subset of the one or more computer-form files may be intended for the recipient and the data category may indicate the recipient of the subset of the one or more computer-form files.

In operation, the server may determine the data category for the data entry by requesting, from one or more databases of the plurality of databases, additional information associated with the data entry and/or the data record of the data entry. For example, an incomplete data entry or data record may require requesting a corrected data entry or a corrected data record from the plurality of databases. In another example, an incorrect data entry or data record may require requesting a corrected data entry or a corrected data record from the plurality of databases. Beneficially, receiving and processing data records on a daily interval prevents or mitigates CPU bottlenecking and/or network bottlenecking caused by categorizing a large number of data records and/or requesting a large number of corrected data entries and/or data records from the plurality of databases.

In some implementations, the server splits a data entry into a first sub-entry and a second sub-entry based on the data entry being mapped to a particular data category in the preconfigured mapping, wherein the first sub-entry is mapped to a first data category and the second sub-record is mapped to a second data category in the preconfigured mapping. In some implementations, the first sub-entry and the second sub-entry are the same. In some implementations, the first sub-entry and the second sub-entry are different. In an example, a transaction is copied to be applied to a first computer-form file in a first format and applied to a second computer-form file in a second format. In another example, a first portion of a transaction is mapped to a first category and a second portion of a transaction is mapped to a second category.

At operation 540, the server, in response to detecting a new customer data requirement, updates the one or more computer-form files associated with each data category according to each data record of each daily interval. The server may detect the new customer data requirement by comparing the one or more computer-form files to a list of active computer-form files and determining that the one or more computer-form files are not present in the list of active computer-form files. In some implementations, the server generates an alert in response to detecting the new customer data requirement. For example, the server may send a notification to a user to notify the user and/or customer that a new customer data requirement has been detected. The user and/or customer may verify the new customer data requirement.

At operation 550, the server, at a preconfigured time, generates the one or more computer-form files based upon each data category using each data record of each daily interval. The server references the data records containing the categorized data entries to generate the one or more computer-form files at the preconfigured time. For example, the server may generate a computer-form file associated with income using data entries categorized as income in the data records. The server may generate the one or more computer-form files and regularly (e.g., daily) evaluates and, if needed, modifies the one or more computer-form files being used or data field(s) of the one or more computer-form files, based on the categorized data entries or changes to the data entries.

In some implementations, the server, in response to a user input, completes the data fields, or otherwise generates, the one or more computer-form files based upon each data category using each data record, as evaluated each daily interval. A user may generate the computer-form files at any time to view the computer-form files generated using the data records, allowing the user to verify the accuracy of the computer-form files. This is made possible by daily categorization of the data entries of the data records and represents an improvement in the field of computer-form file generation.

In some implementations, the server updates a report based on the categorized data entries of the plurality of data records and verifies, at the preconfigured time, the one or more computer-form files using the report. In an example, the report may represent an aggregation of data entries which are used to generate the one or more computer-form files and the report may be used to verify an accuracy of generating the one or more computer-form files.

Figure 6:
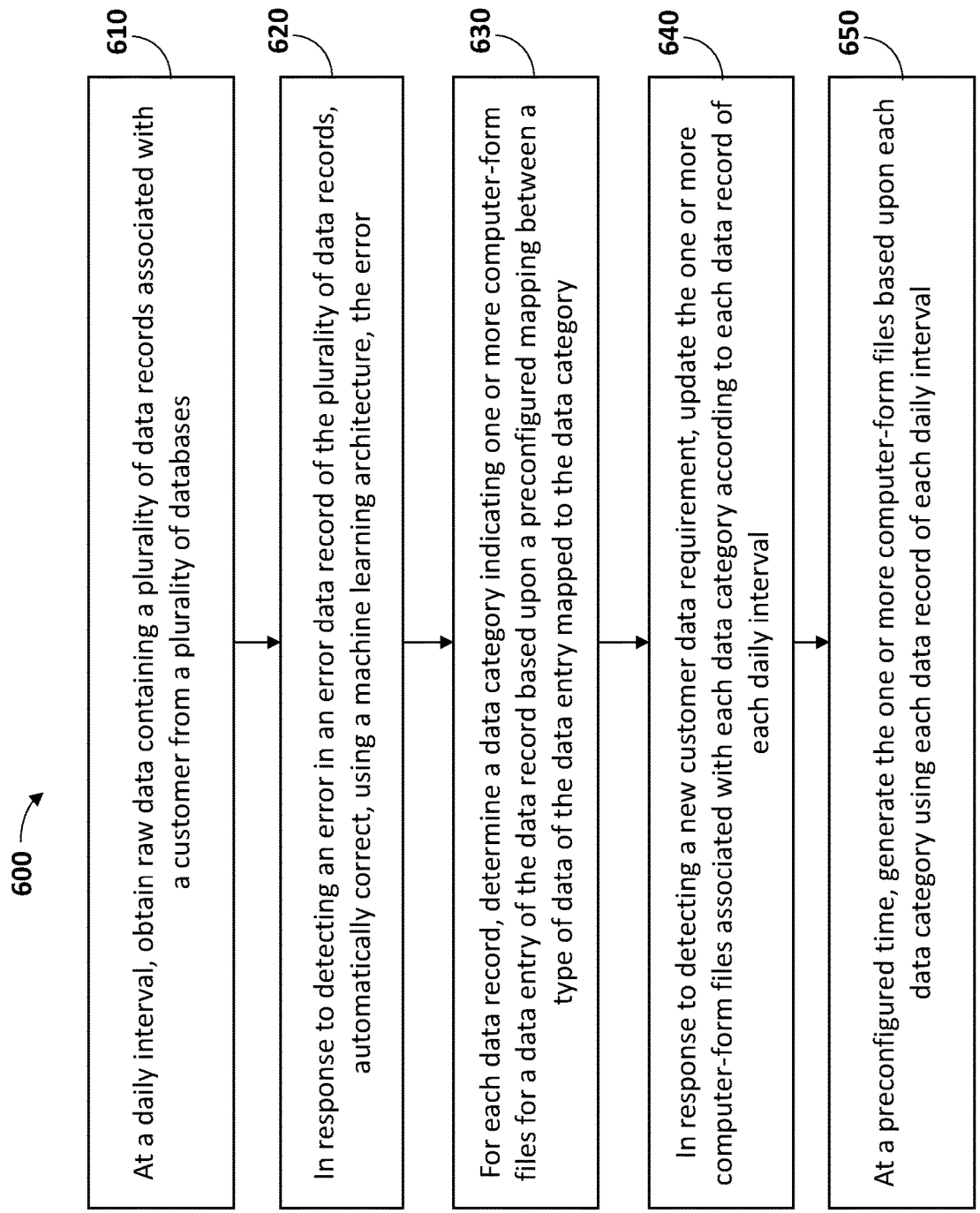
FIG. 6 is a flow chart illustrating operations of a method for using a machine learning architecture to correct errors and updating computer-form files, in accordance with one or more embodiments.

FIG. 6 is a flow chart illustrating operations of a method for determining asset classifications and updating computer-form files, in accordance with one or more embodiments. The method 500 may include more or fewer operations than shown. The operations shown may be performed in the order shown, in a different order, or concurrently. The method 300 may be performed by the server 140 of FIG. 1 or the server 240 of FIG. 2.

At operation 610, a server, at a daily interval, obtains raw data containing a plurality of data records associated with a customer from a plurality of databases. The plurality of data records includes a plurality of data entries. The data entries may include various data types. For example, a first data entry may be demographic information and a second data entry may be transaction data. The server can identify, parse, or categorize data entries as indicated by data type. Obtaining the raw data at a daily interval offers the technical advantage of reducing a processing burden on the server associated with receiving and categorizing the data records.

At operation 620, the server, in response to detecting an error in an error data record of the plurality of data records, automatically corrects, using a machine learning architecture, the error. In some implementations, the machine learning architecture may be trained using historical user input. In some implementations, the machine learning architecture may be applied on the plurality of data records to detect the error. In some implementations, the machine learning architecture may obtain additional data to correct the error. In some implementations, the machine learning architecture may present the error and a proposed correction to a user. Operation 620 may include applying, by the computer, the machine learning architecture on the plurality of data records to detect the new customer data requirement. In some implementations, the machine learning architecture detects the new customer data requirement based on an updated regulation. In some implementations, the machine learning architecture may identify one or more relationships between entities, wherein correcting the error is based on the one or more relationships between entities. In some implementations, the machine learning architecture may correct one or more computer-form file errors in the computer-form files based on a detected pattern. In some implementations, the machine learning architecture may determine a new configuration of a computing environment, the computing environment including the computer.

At operation 630, the server, for each data record, determines a data category indicating one or more computer-form files for a data entry of the data record based upon a preconfigured mapping between a type of data of the data entry mapped to the data category. In some cases, the server determines the type of data or data type of the data entry in order to map the data entry to a data category. The server may apply the mapping data to determine the type of data of the data entry and maps the type of data to the data category. For example, the mapping data may include a mapping between data formats and data types as well as a mapping between data types and data categories.

In some implementations, the server determines the type of data of the data entry based on an indication in the data record of the type of data. For example, the data record may be marked or tagged as including income or transfer transactions. In some implementations, the data category includes or corresponds to a recipient of a subset of the one or more computer-form files. For example, the subset of the one or more computer-form files may be intended for the recipient and the data category may indicate the recipient of the subset of the one or more computer-form files.

In operation, the server may determine the data category for the data entry by requesting, from one or more databases of the plurality of databases, additional information associated with the data entry and/or the data record of the data entry. For example, an incomplete data entry or data record may require requesting a corrected data entry or a corrected data record from the plurality of databases. In another example, an incorrect data entry or data record may require requesting a corrected data entry or a corrected data record from the plurality of databases. Beneficially, receiving and processing data records on a daily interval prevents or mitigates CPU bottlenecking and/or network bottlenecking caused by categorizing a large number of data records and/or requesting a large number of corrected data entries and/or data records from the plurality of databases.

In some implementations, the server splits a data entry into a first sub-entry and a second sub-entry based on the data entry being mapped to a particular data category in the preconfigured mapping, wherein the first sub-entry is mapped to a first data category and the second sub-record is mapped to a second data category in the preconfigured mapping. In some implementations, the first sub-entry and the second sub-entry are the same. In some implementations, the first sub-entry and the second sub-entry are different. In an example, a transaction is copied to be applied to a first computer-form file in a first format and applied to a second computer-form file in a second format. In another example, a first portion of a transaction is mapped to a first category and a second portion of a transaction is mapped to a second category.

At operation 640, the server, in response to detecting a new customer data requirement, updates the one or more computer-form files associated with each data category according to each data record of each daily interval. The server may detect the new customer data requirement by comparing the one or more computer-form files to a list of active computer-form files and determining that the one or more computer-form files are not present in the list of active computer-form files. In some implementations, the server generates an alert in response to detecting the new customer data requirement. For example, the server may send a notification to a user to notify the user and/or customer that a new customer data requirement has been detected. The user and/or customer may verify the new customer data requirement.

At operation 650, the server, at a preconfigured time, generates the one or more computer-form files based upon each data category using each data record of each daily interval. The server references the data records containing the categorized data entries to generate the one or more computer-form files at the preconfigured time. For example, the server may generate a computer-form file associated with income using data entries categorized as income in the data records. The server may generate the one or more computer-form files and regularly (e.g., daily) evaluates and, if needed, modifies the one or more computer-form files being used or data field(s) of the one or more computer-form files, based on the categorized data entries or changes to the data entries.

In some implementations, the server, in response to a user input, completes the data fields, or otherwise generates, the one or more computer-form files based upon each data category using each data record, as evaluated each daily interval. A user may generate the computer-form files at any time to view the computer-form files generated using the data records, allowing the user to verify the accuracy of the computer-form files. This is made possible by daily categorization of the data entries of the data records and represents an improvement in the field of computer-form file generation.

In some implementations, the server updates a report based on the categorized data entries of the plurality of data records and verifies, at the preconfigured time, the one or more computer-form files using the report. In an example, the report may represent an aggregation of data entries which are used to generate the one or more computer-form files and the report may be used to verify an accuracy of generating the one or more computer-form files.

Identify and Correct Errors Using AI/ML

Turning back to FIG. 1, a machine learning infrastructure may be employed to collect and/or analyze the plurality of data records. The machine learning infrastructure may include one or more machine learning models. A machine learning model may be created based on historical data including data records collected, sources of data records, asset classification of data records, categorization of data entries, user input correcting asset classification, user input correcting categorization of data entries, and/or user input correcting actions of the machine learning model. The machine learning infrastructure may be any machine learning or artificial intelligence function of the server 140, such as a software component, a hardware component, or any other function, process, algorithm, or application. In some implementations, the machine learning infrastructure may be executed on the server 140. The machine learning infrastructure may be created with or without human intervention, as described in the Machine Learning section below.

In some implementations, human analysis or cataloging is not required. In an example, the machine learning infrastructure may be trained using the historical data without human intervention. In some implementations, the historical data may be curated using user input. In some implementations, an output of the machine learning infrastructure may be reviewed by a user, resulting in feedback which is used to update the machine learning infrastructure. The amount of data typically collected from the databases 110 may include thousands to tens of thousands of data items for each user. A team of humans would not be able to catalog or analyze the data in any useful manner. Thus, the machine learning infrastructure is needed to process the large volumes of complex data.

The machine learning infrastructure may analyze the plurality of data records from the databases 110. The machine learning infrastructure may be applied on the plurality of data records to detect errors. The machine learning infrastructure may learn from transaction patterns in the plurality of data records to identify common errors and exceptions. In an example, the machine learning infrastructure may identify a pattern of errors in data records from a particular bank or in data records associated with a particular type of transaction. The machine learning infrastructure may correct errors based on detected patterns. The machine learning infrastructure may learn from historical corrections (automatic or human-based) to correct the errors and exceptions. The machine learning infrastructure may be trained used historical user input. The machine learning infrastructure may perform various actions to identify and/or correct errors. The machine learning infrastructure may request additional data from the databases 110 and/or external entities to identify and/or correct an error. In an example, the machine learning infrastructure may identify a potential error in a data record and request additional information from a bank from which the data record originated in order to determine whether the potential error is an error. In an example, the machine learning infrastructure may identify an error in a data record and request a bank, from which the data record originated, to resend the data record and/or to send additional information to correct the error.

The machine learning infrastructure may present a detected error and a proposed correction to a user. The user may verify the error and/or the correction. The machine learning infrastructure may learn from the user verification of the error and/or the correction. The user may modify the correction and/or provide a different correction. The machine learning infrastructure may be updated based on the modified correction and/or the different correction. The user may provide an explanation of the error, the modified correction, and/or the different correction. The machine learning infrastructure may be updated based on the explanation.

The machine learning infrastructure may identify patterns and/or errors that are not observable by a human or not observable without a large amount of comparison data. In an example, the machine learning infrastructure may identify correlations between asset classifications that are not observable without analyzing a large subset of the plurality of data records, which a human could not do in a reasonable amount of time, such as within the daily interval. The machine learning infrastructure may identify data anomalies, including errors in data entries by identifying correlations between data records and/or data entries that are not observable without a large amount of comparison data. The machine learning infrastructure may detect hidden relationships between data records to collect additional data and/or correct errors in the data records. In some implementations, the machine learning infrastructure may identify one or more relationships between entities and correct the error based on the one or more relationships. In an example, the machine learning infrastructure may determine an employment relationship between two entities and correct the error based on the employment relationship. In an example, the machine learning infrastructure may determine common ownership of two bank accounts and correct a determination of income as a transfer.

In an example, the machine learning system is used to correct human errors when collecting data records, verifying a quality or accuracy of the data records, classifying assets, and/or determining data categories for data entries. The machine learning infrastructure may identify and correct errors made by humans by comparing textual data of the plurality of the data records with the human classification and/or categorization. The machine learning infrastructure may employ techniques such as Natural Language Processing (NLP) and deep neural networks. These types of algorithms or processes may be used for analyzing the textual data of the data records. The textual data may include transaction descriptions, notes, or other narrative elements associated with each data record. Machine learning models trained on this textual data can extract meaningful information, detect hidden relationships, and identify potential discrepancies that are missed by the humans. For example, if human errors were made when categorizing data entries, NLP models could identify and correct these errors by comparing the textual data of the data records and/or the data entries with the assigned categories.

The machine learning infrastructure may be used to identify and correct human labeling or identification of fraudulent interactions or users. For example, if a human analyst has incorrectly labelled a user or interaction, or failed to identify a fraudulent user or interaction, a machine learning algorithm can be used to identify the error and correct the labels.

The machine learning infrastructure may be applied on the plurality of data records to detect the new customer data requirement. The machine learning infrastructure may be trained based on historical user identification of new customer data requirements and/or historical identifications of new data requirements by the server 140. In some implementations, the machine learning infrastructure may identify the new customer data requirement based on updated rules or regulations. In some implementations, the machine learning infrastructure may identify the new customer data requirement based on an origin of the plurality of data records. In an example, the machine learning infrastructure may identify the new customer data requirement based on one or more data records originating from a specific jurisdiction, bank, or entity.

The machine learning infrastructure may continually receive feedback and be continually updated. The machine learning infrastructure may continually update one or more machine learning models of the machine learning infrastructure based on the received feedback.

Software programming may perform system monitoring operations at all stages. The real-time vigilance by machine learning models ensures data accuracy and reliability at all stages of the system process monitoring & reliability. Data Integrity and Reconciliation involve machine learning algorithms that cross-verify information from multiple sources in real-time. These algorithms continually update their data reconciliation rules based on evolving data patterns and regulatory changes, ensuring that the generated documents maintain high levels of accuracy. Real-Time Error Detection and Rectification rely on machine learning to monitor the form generation process continuously. Anomaly detection algorithms identify deviations from expected patterns and immediately trigger corrective actions, such as flagging errors for review or suggesting corrections.

Monitoring Rule and Regulation Changes to Build Rulesets

The machine learning infrastructure may monitor rules and regulations related to taxation and financial assets. The machine learning infrastructure may obtain information related to the rules and regulations and analyze the information. The machine learning infrastructure may use NLP algorithms to determine a content of the rules and regulations. The machine learning infrastructure may generate rulesets based on the content of the rules and regulations. The machine learning infrastructure may generate natural language rules and/or mathematical rules. The generated rulesets may be used to collect the plurality of data records, provide asset classifications, categorize the data entries, and/or train the machine learning infrastructure. The machine learning infrastructure may identify changes to the rules and regulations. The machine learning infrastructure may update the processing rules and/or be updated based on the changes to the rules and regulations.

The machine learning infrastructure may correct errors in the data records based on the content of the rules and regulations. The machine learning infrastructure may update the computer-form files based on the content of the rules and regulations. The machine learning infrastructure may generate filings of tax documents and/or re-filings of tax documents based on the rules and regulations and/or the changes to the rules and regulations. The machine learning infrastructure may generate corrections and/or payments based on the rules and regulations and/or the changes to the rules and regulations. The machine learning infrastructure may generate re-filings, corrections, and/or payments for superseded or historic rules and regulations. In an example, the machine learning infrastructure may generate a one-time payment for a superseded tax rule which will not be applied in future years.

Identifying Relationships in Complex Business Structures

The machine learning infrastructure may identify hidden relationships in complex business structure. The machine learning infrastructure may be applied on the plurality of data records to identify the hidden relationships. The machine learning infrastructure may obtain additional data related to business entities and/or relationships between business entities. The machine learning infrastructure may identify ownership of business entities and/or contractual relationships between business entities. The machine learning infrastructure may detect anomalies in the relationships between the business entities. In an example, the machine learning infrastructure may identify a discrepancy between one or more transactions between two business entities and a relationship between the two business entities. The machine learning infrastructure may correct the plurality of data records based on the hidden relationships and/or provide recommendations for modifying the relationships between business entities.

The machine learning infrastructure may identify the new customer data requirement based on the hidden relationships. In an example, the machine learning infrastructure may determine that a hidden relationship between business entities requires a modified approach to tax reporting. The machine learning infrastructure may modify the computer-form files and/or the generated rulesets based on the hidden relationship and/or the new customer data requirement.

Identifying Trends and Risks

The machine learning infrastructure may identify trends and risks associated with financial documents and/or tax reporting. The machine learning infrastructure may be applied on the plurality of data records to identify trends in business entity formation, relationships between business entities, trends in tax reporting, trends in asset classification, and other trends associated with financial documents, business entities, and/or tax reporting. The machine learning infrastructure may identify trends for particular industries, business entity types, and/or tax jurisdictions. The machine learning infrastructure may identify potential tax savings and/or investment opportunities based on the identified trends. The machine learning infrastructure may take one or more automatic actions and/or generate a notification to a user based on the identified potential tax savings and/or investment opportunities.

The machine learning infrastructure may identify one or more risks associated with the identified trends. The machine learning infrastructure may identify one or more probabilities associated with the identified risks. In an example, the machine learning infrastructure may identify an audit risk associated with an identified trend and/or a probability of the audit risk being realized. In an example, the machine learning infrastructure may identify the one or more risks in order to reduce a probability of tax evasion and/or fraud. The machine learning infrastructure may generate a notification to a user based on the identified risk and/or the corresponding probability. The machine learning infrastructure may be updated based on the identified risk and/or the corresponding probability.

Improving System Performance

The machine learning infrastructure may be applied on one or more parameters of a computing system such as the system 100 to determine system performance and opportunities for improvement. The machine learning infrastructure may modify infrastructure configurations to improve performance and/or efficiency. The machine learning infrastructure may be applied on one or more parameters of the databases 110 to provide recommendations for modifying the storage allocation and/or storage resources of the databases 110. In an example, the machine learning infrastructure may generate a recommendation to consolidate one or more databases of the databases 110 or to add a new database specific to a particular bank.

The machine learning infrastructure may be applied on one or more parameters of the server 140 to generate recommendations to improve a performance of the server 140. In an example, the machine learning infrastructure may generate a recommendation that the functions of the server 140 be split across multiple hardware devices as a service to increase a reliability of the server 140. In an example, the machine learning infrastructure may generate a recommendation to increase storage and/or compute resources of the server 140. In an example, the machine learning infrastructure may generate a recommendation to update a software of the server 140.

The machine learning infrastructure may identify one or more behavior trends of the system 100. The machine learning infrastructure may generate recommendations based on the identified behavior trends. In an example, the machine learning infrastructure may identify a trend of increased activity or increased data records and recommend adding additional databases or cloud servers. In an example, the machine learning infrastructure may identify a trend of reduced activity or reduced data records from a particular database and recommend reducing storage resources of the particular database.

In an example, a computer-implemented method may include, at a daily interval, obtaining, by a computer, raw data containing a plurality of data records associated with a customer from a plurality of databases, for each data record of the plurality of data records, determining, by the computer, an asset classification corresponding to the data record, determining, by the computer, a data category indicating one or more computer-form files for a data entry of the data record based upon a preconfigured mapping between a type of data of the data entry mapped to the data category, and in response to detecting a new customer data requirement, updating, by the computer, the one or more computer-form files associated with each data category according to each data record of each daily interval, and at a preconfigured time, generating, by the computer, the one or more computer-form files based upon each data category using each data record of each daily interval. In the method, determining the asset classification may include applying a classification hierarchy to the data record. In the method, the classification hierarchy may be based on tax reporting rules, and wherein the asset classification corresponds to a taxable class of assets. In the method, applying the classification hierarchy to the data record may include applying a decision tree corresponding to the classification hierarchy. The method may include updating, by the computer, the classification hierarchy based on user input. In the method, the classification hierarchy may include a mapping of multiple asset names to a unified asset classification. In the method, the type of the data entry may include the asset classification of the data record. In the method, determining the asset classification may include applying a machine learning infrastructure on the data record. In the method, determining the asset classification may include identifying an origin of the data record. The method may include modifying, by the computer, the one or more computer-form files using the asset classifications of each data record.

In an example, a computer-implemented method may include, at a daily interval, obtaining, by a computer, raw data containing a plurality of data records associated with a customer from a plurality of databases, in response to detecting an error in an error data record of the plurality of data records, automatically correcting, by the computer, executing a machine learning architecture, the error, for each data record of the plurality of data records, determining, by the computer, a data category indicating one or more computer-form files for a data entry of the data record based upon a preconfigured mapping between a type of data of the data entry mapped to the data category, and in response to detecting a new customer data requirement, updating, by the computer, the one or more computer-form files associated with each data category according to each data record of each daily interval, and at a preconfigured time, generating, by the computer, the one or more computer-form files based upon each data category using each data record of each daily interval.

In the method, the machine learning architecture may be trained using historical user input. In the method, the machine learning architecture may be applied on the plurality of data records to detect the error. In the method, the machine learning architecture may obtain additional data to correct the error. In the method, the machine learning architecture may present the error and a proposed correction to a user. The method may include applying, by the computer, the machine learning architecture on the plurality of data records to detect the new customer data requirement. In the method, the machine learning architecture detects the new customer data requirement based on an updated regulation. In the method, the machine learning architecture may identify one or more relationships between entities, wherein correcting the error is based on the one or more relationships between entities. In the method, the machine learning architecture may correct one or more computer-form file errors in the computer-form files based on a detected pattern. In the method, the machine learning architecture may determine a new configuration of a computing environment, the computing environment including the computer.

Machine Learning

Machine learning is a field of study within artificial intelligence that allows computers to learn functional relationships between inputs and outputs without being explicitly programmed.

The term "Artificial Intelligence" refers to a quantitative method, system, or approach ("techniques") that emulates human intelligence via computer programs. These can be used to make estimates, predictions, recommendations, or decisions in manners that go beyond classical, statistical, mathematical, econometric, or financial approaches.

Machine learning is the subset of AI that derives representations or inferences from data without explicitly programming every parameter representation or computer step (for example, Random Forest or Artificial Neural Network based algorithm approaches). In contrast, AI techniques that are not members of the machine learning subset include techniques such as fuzzy logic, complex dependency parsing techniques for natural language processing.

Machine learning involves a module comprising algorithms that may learn from existing data by analyzing, categorizing, or identifying the data. Such machine-learning algorithms operate by first constructing a model from training data to make predictions or decisions expressed as outputs. In example embodiments, the training data includes data for one or more identified features and one or more outcomes, for example using user purchasing histories and geolocations to offer real-time incentives for purchases with a payment instrument to an identified high spend event to users likely to switch payment instruments. Although example embodiments are presented with respect to a few machine-learning algorithms, the principles presented herein may be applied to other machine-learning algorithms.

Data supplied to a machine learning algorithm can be considered a feature, which can be described as an individual measurable property of a phenomenon being observed. The concept of feature is related to that of an independent variable used in statistical techniques such as those used in linear regression. The performance of a machine learning algorithm in pattern recognition, classification and regression is highly dependent on choosing informative, discriminating, and independent features. Features may comprise numerical data, categorical data, time-series data, strings, graphs, or images.

In general, there are two categories of machine learning problems: classification problems and regression problems. Classification problems, also referred to as categorization problems, aim at classifying items into discrete category values. Training data teaches the classifying algorithm how to classify. In example embodiments, features to be categorized may include transaction data, which can be provided to the classifying machine learning algorithm and then placed into categories of, for example, transactions with payment instrument X, transactions at geolocation Y, or incentives provided that prompted a change in payment instrument.

Regression algorithms aim at quantifying and correlating one or more features. Training data teaches the regression algorithm how to correlate the one or more features into a quantifiable value.

(1) Embedding

In one example, the machine learning module may use embedding to provide a lower dimensional representation, such as a vector, of features to organize them based off respective similarities. In some situations, these vectors can become massive. In the case of massive vectors, particular values may become very sparse among a large number of values (e.g., a single instance of a value among 50,000 values). Because such vectors are difficult to work with, reducing the size of the vectors, in some instances, is necessary. A machine learning module can learn the embeddings along with the model parameters. In example embodiments, features such as geolocation can be mapped to vectors implemented in embedding methods. In example embodiments, embedded semantic meanings are utilized. Embedded semantic meanings are values of respective similarity. For example, the distance between two vectors, in vector space, may imply two values located elsewhere with the same distance are categorically similar. Embedded semantic meanings can be used with similarity analysis to rapidly return similar values. In example embodiments, the methods herein are developed to identify meaningful portions of the vector and extract semantic meanings between that space.

(2) Training Methods

In example embodiments, the machine learning module can be trained using techniques such as unsupervised, supervised, semi-supervised, reinforcement learning, transfer learning, incremental learning, curriculum learning techniques, and/or learning to learn. Training typically occurs after selection and development of a machine learning module and before the machine learning module is operably in use. In one aspect, the training data used to teach the machine learning module can comprise input data such as user interaction histories and the respective target output data such as whether a user is likely to conduct a fraudulent interaction.

(a) Unsupervised and Supervised Learning

In an example embodiment, unsupervised learning is implemented. Unsupervised learning can involve providing all or a portion of unlabeled training data to a machine learning module. The machine learning module can then determine one or more outputs implicitly based on the provided unlabeled training data. In an example embodiment, supervised learning is implemented. Supervised learning can involve providing all or a portion of labeled training data to a machine learning module, with the machine learning module determining one or more outputs based on the provided labeled training data, and the outputs are either accepted or corrected depending on the agreement to the actual outcome of the training data. In some examples, supervised learning of machine learning system(s) can be governed by a set of rules and/or a set of labels for the training input, and the set of rules and/or set of labels may be used to correct inferences of a machine learning module.

(b) Semi-Supervised and Reinforcement Learning

In one example embodiment, semi-supervised learning is implemented. Semi-supervised learning can involve providing all or a portion of training data that is partially labeled to a machine learning module. During semi-supervised learning, supervised learning is used for a portion of labeled training data, and unsupervised learning is used for a portion of unlabeled training data. In one example embodiment, reinforcement learning is implemented. Reinforcement learning can involve first providing all or a portion of the training data to a machine learning module and as the machine learning module produces an output, the machine learning module receives a "reward" signal in response to a correct output. Typically, the reward signal is a numerical value and the machine learning module is developed to maximize the numerical value of the reward signal. In addition, reinforcement learning can adopt a value function that provides a numerical value representing an expected total of the numerical values provided by the reward signal over time.

(c) Transfer Learning

In one example embodiment, transfer learning is implemented. Transfer learning techniques can involve providing all or a portion of a first training data to a machine learning module, then, after training on the first training data, providing all or a portion of a second training data. In example embodiments, a first machine learning module can be pre-trained on data from one or more computing devices. The first trained machine learning module is then provided to a computing device, where the computing device is intended to execute the first trained machine learning model to produce an output. Then, during the second training phase, the first trained machine learning model can be additionally trained using additional training data, where the training data can be derived from kernel and non-kernel data of one or more computing devices. This second training of the machine learning module and/or the first trained machine learning model using the training data can be performed using either supervised, unsupervised, or semi-supervised learning. In addition, it is understood transfer learning techniques can involve one, two, three, or more training attempts. Once the machine learning module has been trained on at least the training data, the training phase can be completed. The resulting trained machine learning model can be utilized as at least one of trained machine learning module.

(d) Incremental and Curriculum Learning

In one example embodiment, incremental learning is implemented. Incremental learning techniques can involve providing a trained machine learning module with input data that is used to continuously extend the knowledge of the trained machine learning module. Another machine learning training technique is curriculum learning, which can involve training the machine learning module with training data arranged in a particular order, such as providing relatively easy training examples first, then proceeding with progressively more difficult training examples. As the name suggests, difficulty of training data is analogous to a curriculum or course of study at a school.

(e) Learning to Learn

In one example embodiment, learning to learn is implemented. Learning to learn, or meta-learning, comprises, in general, two levels of learning: quick learning of a single task and slower learning across many tasks. For example, a machine learning module is first trained and comprises of a first set of parameters or weights. During or after operation of the first trained machine learning module, the parameters or weights are adjusted by the machine learning module. This process occurs iteratively on the success of the machine learning module. In another example, an optimizer, or another machine learning module, is used wherein the output of a first trained machine learning module is fed to an optimizer that constantly learns and returns the final results. Other techniques for training the machine learning module and/or trained machine learning module are possible as well.

(f) Contrastive Learning

In example embodiment, contrastive learning is implemented. Contrastive learning is a self-supervised model of learning in which training data is unlabeled is considered as a form of learning in-between supervised and unsupervised learning. This method learns by contrastive loss, which separates unrelated (i.e., negative) data pairs and connects related (i.e., positive) data pairs. For example, to create positive and negative data pairs, more than one view of a datapoint, such as rotating an image or using a different time-point of a video, is used as input. Positive and negative pairs are learned by solving dictionary look-up problem. The two views are separated into query and key of a dictionary. A query has a positive match to a key and negative match to all other keys. The machine learning module then learns by connecting queries to their keys and separating queries from their non-keys. A loss function, such as those described herein, is used to minimize the distance between positive data pairs (e.g., a query to its key) while maximizing the distance between negative data points. See e.g., Tian, Yonglong, et al. "What makes for good views for contrastive learning?" Advances in Neural Information Processing Systems 33 (2020): 6827-6839.

(g) Pre-Trained Learning

In example embodiments, the machine learning module is pre-trained. A pre-trained machine learning model is a model that has been previously trained to solve a similar problem. The pre-trained machine learning model is generally pre-trained with similar input data to that of the new problem. A pre-trained machine learning model further trained to solve a new problem is generally referred to as transfer learning, which is described herein. In some instances, a pre-trained machine learning model is trained on a large dataset of related information. The pre-trained model is then further trained and tuned for the new problem. Using a pre-trained machine learning module provides the advantage of building a new machine learning module with input neurons/nodes that are already familiar with the input data and are more readily refined to a particular problem. See e.g., Diamant N, et al. Patient contrastive learning: A performant, expressive, and practical approach to electrocardiogram modeling. PLOS Comput Biol. 2022 Feb. 14; 18(2):e1009862.

In some examples, after the training phase has been completed but before producing predictions expressed as outputs, a trained machine learning module can be provided to a computing device where a trained machine learning module is not already resident, in other words, after training phase has been completed, the trained machine learning module can be downloaded to a computing device. For example, a first computing device storing a trained machine learning module can provide the trained machine learning module to a second computing device. Providing a trained machine learning module to the second computing device may comprise one or more of communicating a copy of trained machine learning module to the second computing device, making a copy of trained machine learning module for the second computing device, providing access to trained machine learning module to the second computing device, and/or otherwise providing the trained machine learning system to the second computing device. In example embodiments, a trained machine learning module can be used by the second computing device immediately after being provided by the first computing device. In some examples, after a trained machine learning module is provided to the second computing device, the trained machine learning module can be installed and/or otherwise prepared for use before the trained machine learning module can be used by the second computing device.

After a machine learning model has been trained it can be used to output, estimate, infer, predict, generate, produce, or determine, for simplicity these terms will collectively be referred to as results. A trained machine learning module can receive input data and operably generate results. As such, the input data can be used as an input to the trained machine learning module for providing corresponding results to kernel components and non-kernel components. For example, a trained machine learning module can generate results in response to requests. In example embodiments, a trained machine learning module can be executed by a portion of other software. For example, a trained machine learning module can be executed by a result daemon to be readily available to provide results upon request.

In example embodiments, a machine learning module and/or trained machine learning module can be executed and/or accelerated using one or more computer processors and/or on-device co-processors. Such on-device co-processors can speed up training of a machine learning module and/or generation of results. In some examples, trained machine learning module can be trained, reside, and execute to provide results on a particular computing device, and/or otherwise can make results for the particular computing device.

Input data can include data from a computing device executing a trained machine learning module and/or input data from one or more computing devices. In example embodiments, a trained machine learning module can use results as input feedback. A trained machine learning module can also rely on past results as inputs for generating new results. In example embodiments, input data can comprise interaction histories and, when provided to a trained machine learning module, results in output data such as users that are likely to perform fraudulent interactions. The output can then be provided to the incentive system to use in determining what incentives to offer to certain users. As such, the identification-related technical problem of determining when a user that is likely to change payment instruments is at a high spend event can be solved using the herein-described techniques that utilize machine learning to produce outputs of when high spend events are occurring, what users should be targeted, and what incentives should be provided.

(3) Algorithms

Different machine-learning algorithms have been contemplated to carry out the embodiments discussed herein. For example, linear regression (LiR), logistic regression (LoR), Bayesian networks (for example, naive-bayes), random forest (RF) (including decision trees), neural networks (NN) (also known as artificial neural networks), matrix factorization, a hidden Markov model (HMM), support vector machines (SVM), K-means clustering (KMC), K-nearest neighbor (KNN), a suitable statistical machine learning algorithm, and/or a heuristic machine learning system for classifying or evaluating whether a user is likely to conduct a fraudulent interaction.

The methods described herein can be implemented with more than one machine learning method. The machine learning system can use a combination of machine learning algorithms. The machine learning algorithms may be of the same type or of different types. For example, a first machine learning algorithm may be trained for a first type of result, while a second machine learning algorithm may be trained for a second type of result. In certain examples, the first type of result may be an input into the second machine learning algorithm, while in other examples, the two results are combined to produce a third result. In certain examples, the first and second types of results are both inputs into a third machine learning algorithm that produces the third result.

(a) Linear Regression (LiR)

In one example embodiment, linear regression machine learning is implemented. LiR is typically used in machine learning to predict a result through the mathematical relationship between an independent and dependent variable. A simple linear regression model would have one independent variable (x) and one dependent variable (y). A representation of an example mathematical relationship of a simple linear regression model would be y=mx+b. In this example, the machine learning algorithm tries variations of the tuning variables m and b to optimize a line that includes all the given training data.

The tuning variables can be optimized, for example, with a cost function. A cost function takes advantage of the minimization problem to identify the optimal tuning variables. The minimization problem preposes the optimal tuning variable will minimize the error between the predicted outcome and the actual outcome. An example cost function may comprise summing all the square differences between the predicted and actual output values and dividing them by the total number of input values and results in the average square error.

To select new tuning variables to reduce the cost function, the machine learning module may use, for example, gradient descent methods. An example gradient descent method comprises evaluating the partial derivative of the cost function with respect to the tuning variables. The sign and magnitude of the partial derivatives indicate whether the choice of a new tuning variable value will reduce the cost function, thereby optimizing the linear regression algorithm. A new tuning variable value is selected depending on a set threshold. Depending on the machine learning module, a steep or gradual negative slope is selected. Both the cost function and gradient descent can be used with other algorithms and modules mentioned throughout. For the sake of brevity, both the cost function and gradient descent are well known in the art and are applicable to other machine learning algorithms and may not be mentioned with the same detail.

LiR models may have many levels of complexity comprising one or more independent variables. Furthermore, in an LiR function with more than one independent variable, each independent variable may have the same one or more tuning variables or each, separately, may have their own one or more tuning variables. The number of independent variables and tuning variables will be understood to one skilled in the art for the problem being solved. In example embodiments, user interaction histories are used as the independent variables to train a LiR machine learning module, which, after training, is used to estimate, for example, whether a user is likely to conduct a fraudulent interaction.

(b) Logistic Regression (LoR)

In one example embodiment, logistic regression machine learning is implemented. Logistic Regression, often considered a LiR type model, is typically used in machine learning to classify information, such as user interaction histories into categories such as whether a user is likely to conduct a fraudulent interaction. LoR takes advantage of probability to predict an outcome from input data. However, what makes LoR different from a LiR is that LoR uses a more complex logistic function, for example a sigmoid function. In addition, the cost function can be a sigmoid function limited to a result between 0 and 1. For example, the sigmoid function can be of the form $f(x)=1/(1+e^{-x})$, where x represents some linear representation of input features and tuning variables. Similar to LiR, the tuning variable(s) of the cost function are optimized (typically by taking the log of some variation of the cost function) such that the result of the cost function, given variable representations of the input features, is a number between 0 and 1, preferably falling on either side of 0.5. As described in LiR, gradient descent may also be used in LoR cost function optimization and is an example of the process. In example embodiments, user interaction histories are used as the independent variables to train a LoR machine learning module, which, after training, is used to estimate, for example, whether a user is likely to conduct a fraudulent interaction.

(c) Bayesian Network

In one example embodiment, a Bayesian Network is implemented. BNs are used in machine learning to make predictions through Bayesian inference from probabilistic graphical models. In BNs, input features are mapped onto a directed acyclic graph forming the nodes of the graph. The edges connecting the nodes contain the conditional dependencies between nodes to form a predicative model. For each connected node, the probability of the input features resulting in the connected node is learned and forms the predictive mechanism. The nodes may comprise the same, similar or different probability functions to determine movement from one node to another. The nodes of a Bayesian network are conditionally independent of its non-descendants given its parents thus satisfying a local Markov property. This property affords reduced computations in larger networks by simplifying the joint distribution.

There are multiple methods to evaluate the inference, or predictability, in a BN but only two are mentioned for demonstrative purposes. The first method involves computing the joint probability of a particular assignment of values for each variable. The joint probability can be considered the product of each conditional probability and, in some instances, comprises the logarithm of that product. The second method is Markov chain Monte Carlo (MCMC), which can be implemented when the sample size is large. MCMC is a well-known class of sample distribution algorithms and will not be discussed in detail herein.

The assumption of conditional independence of variables forms the basis for Naïve Bayes classifiers. This assumption implies there is no correlation between different input features. As a result, the number of computed probabilities is significantly reduced as well as the computation of the probability normalization. While independence between features is rarely true, this assumption exchanges reduced computations for less accurate predictions, however the predictions are reasonably accurate. In example embodiments, user interaction histories are mapped to the BN graph to train the BN machine learning module, which, after training, is used to estimate whether a user is likely to conduct a fraudulent interaction.

(d) Random Forest

In one example embodiment, random forest ("RF") is implemented. RF consists of an ensemble of decision trees producing individual class predictions. The prevailing prediction from the ensemble of decision trees becomes the RF prediction. Decision trees are branching flowchart-like graphs comprising of the root, nodes, edges/branches, and leaves. The root is the first decision node from which feature information is assessed and from it extends the first set of edges/branches. The edges/branches contain the information of the outcome of a node and pass the information to the next node. The leaf nodes are the terminal nodes that output the prediction. Decision trees can be used for both classification as well as regression and is typically trained using supervised learning methods. Training of a decision tree is sensitive to the training data set. An individual decision tree may become over or under-fit to the training data and result in a poor predictive model. Random forest compensates by using multiple decision trees trained on different data sets. In example embodiments, user interaction histories are used to train the nodes of the decision trees of a RF machine learning module, which, after training, is used to estimate whether a user is likely to conduct a fraudulent interaction.

(i) Gradient Boosting

In an example embodiment, gradient boosting is implemented. Gradient boosting is a method of strengthening the evaluation capability of a decision tree node. In general, a tree is fit on a modified version of an original data set. For example, a decision tree is first trained with equal weights across its nodes. The decision tree is allowed to evaluate data to identify nodes that are less accurate. Another tree is added to the model and the weights of the corresponding underperforming nodes are then modified in the new tree to improve their accuracy. This process is performed iteratively until the accuracy of the model has reached a defined threshold or a defined limit of trees has been reached. Less accurate nodes are identified by the gradient of a loss function. Loss functions must be differentiable such as a linear or logarithmic functions. The modified node weights in the new tree are selected to minimize the gradient of the loss function. In an example embodiment, a decision tree is implemented to determine a user interaction histories and gradient boosting is applied to the tree to improve its ability to accurately determine whether a user is likely to conduct a fraudulent interaction.

(e) Neural Networks

In one example embodiment, Neural Networks are implemented. NNs are a family of statistical learning models influenced by biological neural networks of the brain. NNs can be trained on a relatively-large dataset (e.g., 50,000 or more) and used to estimate, approximate, or predict an output that depends on a large number of inputs/features. NNs can be envisioned as so-called "neuromorphic" systems of interconnected processor elements, or "neurons", and exchange electronic signals, or "messages". Similar to the so-called "plasticity" of synaptic neurotransmitter connections that carry messages between biological neurons, the connections in NNs that carry electronic "messages" between "neurons" are provided with numeric weights that correspond to the strength or weakness of a given connection. The weights can be tuned based on experience, making NNs adaptive to inputs and capable of learning. For example, an NN for user interaction histories is defined by a set of input neurons that can be given input data such as user transactions. The input neuron weighs and transforms the input data and passes the result to other neurons, often referred to as "hidden" neurons. This is repeated until an output neuron is activated. The activated output neuron produces a result. In example embodiments, user transaction histories and secondary user actions or data are used to train the neurons in a NN machine learning module, which, after training, is used to estimate whether a user is likely to conduct a fraudulent interaction.

(i) Convolutional Autoencoder

In example embodiments, convolutional autoencoder (CAE) is implemented. A CAE is a type of neural network and comprises, in general, two main components. First, the convolutional operator that filters an input signal to extract features of the signal. Second, an autoencoder that learns a set of signals from an input and reconstructs the signal into an output. By combining these two components, the CAE learns the optimal filters that minimize reconstruction error resulting an improved output. CAEs are trained to only learn filters capable of feature extraction that can be used to reconstruct the input. Generally, convolutional autoencoders implement unsupervised learning. In example embodiments, the convolutional autoencoder is a variational convolutional autoencoder. In example embodiments, features from user interaction histories are used as an input signal into a CAE which reconstructs that signal into an output such as a whether a user is likely to conduct a fraudulent interaction.

(ii) Deep Learning

In example embodiments, deep learning is implemented. Deep learning expands the neural network by including more layers of neurons. A deep learning module is characterized as having three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction. In example embodiments, user interaction histories are used to train the neurons of a deep learning module, which, after training, is used to estimate whether a user is likely to conduct a fraudulent interaction.

(iii) Convolutional Neural Network (CNN)

In an example embodiment, a convolutional neural network is implemented. CNNs is a class of NNs further attempting to replicate the biological neural networks, but of the animal visual cortex. CNNs process data with a grid pattern to learn spatial hierarchies of features. Wherein NNs are highly connected, sometimes fully connected, CNNs are connected such that neurons corresponding to neighboring data (e.g., pixels) are connected. This significantly reduces the number of weights and calculations each neuron must perform.

In general, input data, such user interaction histories, comprises of a multidimensional vector. A CNN, typically, comprises of three layers: convolution, pooling, and fully connected. The convolution and pooling layers extract features and the fully connected layer combines the extracted features into an output, such as whether a user is likely to conduct a fraudulent interaction.

In particular, the convolutional layer comprises of multiple mathematical operations such as of linear operations, a specialized type being a convolution. The convolutional layer calculates the scalar product between the weights and the region connected to the input volume of the neurons. These computations are performed on kernels, which are reduced dimensions of the input vector. The kernels span the entirety of the input. The rectified linear unit (i.e., ReLu) applies an elementwise activation function (e.g., sigmoid function) on the kernels.

CNNs can optimized with hyperparameters. In general, there three hyperparameters are used: depth, stride, and zero-padding. Depth controls the number of neurons within a layer. Reducing the depth may increase the speed of the CNN but may also reduce the accuracy of the CNN. Stride determines the overlap of the neurons. Zero-padding controls the border padding in the input.

The pooling layer down-samples along the spatial dimensionality of the given input (i.e., convolutional layer output), reducing the number of parameters within that activation. As an example, kernels are reduced to dimensionalities of 2×2 with a stride of 2, which scales the activation map down to 25%. The fully connected layer uses inter-layer-connected neurons (i.e., neurons are only connected to neurons in other layers) to score the activations for classification and/or regression. Extracted features may become hierarchically more complex as one layer feeds its output into the next layer. See O'Shea, K.; Nash, R. An Introduction to Convolutional Neural Networks. arXiv 2015 and Yamashita, R., et al, Convolutional neural networks: an overview and application in radiology. *Insights Imaging* 9, 611-629 (2018).

(iv) Recurrent Neural Network (RNN)

In an example embodiment, a recurrent neural network is implemented. RNNs are class of NNs further attempting to replicate the biological neural networks of the brain. RNNs comprise of delay differential equations on sequential data or time series data to replicate the processes and interactions of the human brain. RNNs have "memory" wherein the RNN can take information from prior inputs to influence the current output. RNNs can process variable length sequences of inputs by using their "memory" or internal state information. Where NNs may assume inputs are independent from the outputs, the outputs of RNNs may be dependent on prior elements with the input sequence. For example, input such as user interaction histories is received by a RNN, which determines whether a user is likely to conduct a fraudulent interaction. See Sherstinsky, Alex. "Fundamentals of recurrent neural network (RNN) and long short-term memory (LSTM) network." Physica D: Nonlinear Phenomena 404 (2020): 132306.

1) Long Short-Term Memory (LSTM)

In an example embodiment, a Long Short-term Memory is implemented. LSTM are a class of RNNs designed to overcome vanishing and exploding gradients. In RNNs, long term dependencies become more difficult to capture because the parameters or weights either do not change with training or fluctuate rapidly. This occurs when the RNN gradient exponentially decreases to zero, resulting in no change to the weights or parameters, or exponentially increases to infinity, resulting in large changes in the weights or parameters. This exponential effect is dependent on the number of layers and multiplicative gradient. LSTM overcomes the vanishing/exploding gradients by implementing "cells" within the hidden layers of the NN. The "cells" comprise three gates: an input gate, an output gate, and a forget gate. The input gate reduces error by controlling relevant inputs to update the current cell state. The output gate reduces error by controlling relevant memory content in the present hidden state. The forget gate reduces error by controlling whether prior cell states are put in "memory" or forgotten. The gates use activation functions to determine whether the data can pass through the gates. While one skilled in the art would recognize the use of any relevant activation function, example activation functions are sigmoid, tanh, and RELU. See Zhu, Xiaodan, et al. "Long short-term memory over recursive structures." International Conference on Machine Learning. PMLR, 2015.

(f) Matrix Factorization

In example embodiments, Matrix Factorization is implemented. Matrix factorization machine learning exploits inherent relationships between two entities drawn out when multiplied together. Generally, the input features are mapped to a matrix F which is multiplied with a matrix R containing the relationship between the features and a predicted outcome. The resulting dot product provides the prediction. The matrix R is constructed by assigning random values throughout the matrix. In this example, two training matrices are assembled. The first matrix X contains training input features and the second matrix Z contains the known output of the training input features. First the dot product of R and X are computed and the square mean error, as one example method, of the result is estimated. The values in R are modulated and the process is repeated in a gradient descent style approach until the error is appropriately minimized. The trained matrix R is then used in the machine learning model. In example embodiments, user interaction histories are used to train the relationship matrix R in a matrix factorization machine learning module. After training, the relationship matrix R and input matrix F, which comprises vector representations of user interaction histories, results in the prediction matrix P comprising whether a user is likely to conduct a fraudulent interaction.

(g) Hidden Markov Model

In example embodiments, a hidden Markov model is implemented. A HMM takes advantage of the statistical Markov model to predict an outcome. A Markov model assumes a Markov process, wherein the probability of an outcome is solely dependent on the previous event. In the case of HMM, it is assumed an unknown or "hidden" state is dependent on some observable event. A HMM comprises a network of connected nodes. Traversing the network is dependent on three model parameters: start probability; state transition probabilities; and observation probability. The start probability is a variable that governs, from the input node, the most plausible consecutive state. From there each node i has a state transition probability to node j. Typically the state transition probabilities are stored in a matrix $M_{ij}$ wherein the sum of the rows, representing the probability of state i transitioning to state j, equals 1. The observation probability is a variable containing the probability of output o occurring. These too are typically stored in a matrix $N_{oj}$ wherein the probability of output o is dependent on state j. To build the model parameters and train the HMM, the state and output probabilities are computed. This can be accomplished with, for example, an inductive algorithm. Next, the state sequences are ranked on probability, which can be accomplished, for example, with the Viterbi algorithm. Finally, the model parameters are modulated to maximize the probability of a certain sequence of observations. This is typically accomplished with an iterative process wherein the neighborhood of states is explored, the probabilities of the state sequences are measured, and model parameters updated to increase the probabilities of the state sequences. In example embodiments, user interaction histories are used to train the nodes/states of the HMM machine learning module, which, after training, is used to estimate whether a user is likely to conduct a fraudulent interaction.

(h) Support Vector Machine

In example embodiments, support vector machines are implemented. SVMs separate data into classes defined by n-dimensional hyperplanes (n-hyperplane) and are used in both regression and classification problems. Hyperplanes are decision boundaries developed during the training process of a SVM. The dimensionality of a hyperplane depends on the number of input features. For example, a SVM with two input features will have a linear (1-dimensional) hyperplane while a SVM with three input features will have a planer (2-dimensional) hyperplane. A hyperplane is optimized to have the largest margin or spatial distance from the nearest data point for each data type. In the case of simple linear regression and classification a linear equation is used to develop the hyperplane. However, when the features are more complex a kernel is used to describe the hyperplane. A kernel is a function that transforms the input features into higher dimensional space. Kernel functions can be linear, polynomial, a radial distribution function (or gaussian radial distribution function), or sigmoidal. In example embodiments, user interaction histories are used to train the linear equation or kernel function of the SVM machine learning module, which, after training, is used to estimate whether a user is likely to conduct a fraudulent interaction.

(i) K-Means Clustering

In one example embodiment, K-means clustering is implemented. KMC assumes data points have implicit shared characteristics and "clusters" data within a centroid or "mean" of the clustered data points. During training, KMC adds a number of k centroids and optimizes its position around clusters. This process is iterative, where each centroid, initially positioned at random, is re-positioned towards the average point of a cluster. This process concludes when the centroids have reached an optimal position within a cluster. Training of a KMC module is typically unsupervised. In example embodiments, user interaction histories are used to train the centroids of a KMC machine learning module, which, after training, is used to estimate whether a user is likely to conduct a fraudulent interaction.

(j) K-Nearest Neighbor

In one example embodiment, K-nearest neighbor is implemented. On a general level, KNN shares similar characteristics to KMC. For example, KNN assumes data points near each other share similar characteristics and computes the distance between data points to identify those similar characteristics but instead of k centroids, KNN uses k number of neighbors. The k in KNN represents how many neighbors will assign a data point to a class, for classification, or object property value, for regression. Selection of an appropriate number of k is integral to the accuracy of KNN. For example, a large k may reduce random error associated with variance in the data but increase error by ignoring small but significant differences in the data. Therefore, a careful choice of k is selected to balance overfitting and underfitting. Concluding whether some data point belongs to some class or property value k, the distance between neighbors is computed. Common methods to compute this distance are Euclidean, Manhattan or Hamming to name a few. In some embodiments, neighbors are given weights depending on the neighbor distance to scale the similarity between neighbors to reduce the error of edge neighbors of one class "outvoting" near neighbors of another class. In one example embodiment, k is 1 and a Markov model approach is utilized. In example embodiments, user interaction histories are used to train a KNN machine learning module, which, after training, is used to estimate whether a user is likely to conduct a fraudulent interaction.

To perform one or more of its functionalities, the machine learning module may communicate with one or more other systems. For example, an integration system may integrate the machine learning module with one or more email servers, web servers, one or more databases, or other servers, systems, or repositories. In addition, one or more functionalities may require communication between a user and the machine learning module.

Any one or more of the modules described herein may be implemented using hardware (e.g., one or more processors of a computer/machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, to allow information to be passed between the applications so as to allow the applications to share and access common data.

ii. Multimodal Translation

In an example embodiment, the machine learning module comprises multimodal translation (MT), also known as multimodal machine translation or multimodal neural machine translation. MT comprises of a machine learning module capable of receiving multiple (e.g. two or more) modalities. Typically, the multiple modalities comprise of information connected to each other.

In example embodiments, the MT may comprise of a machine learning method further described herein. In an example embodiment, the MT comprises a neural network, deep neural network, convolutional neural network, convolutional autoencoder, recurrent neural network, or an LSTM. For example, one or more microscopy imaging data comprising multiple modalities from a subject is embedded as further described herein. The embedded data is then received by the machine learning module. The machine learning module processes the embedded data (e.g., encoding and decoding) through the multiple layers of architecture then determines the corresponding the modalities comprising the input. The machine learning methods further described herein may be engineered for MT wherein the inputs described herein comprise of multiple modalities. See, e.g., Sulubacak, U., Caglayan, O., Grönroos, S A. et al. Multimodal machine translation through visuals and speech. Machine Translation 34, 97-147 (2020) and Huang, Xun, et al. "Multimodal unsupervised image-to-image translation." Proceedings of the European conference on computer vision (ECCV). 2018.

The server detects, based on the data entries and/or the data records, that the customer has a new customer data requirement requiring the inclusion of a new tax form. The tax form server updates the tax forms to include the new tax form and updates the categories to include a new category for the new tax form. At the end of a tax year, the tax form server generates the tax forms required for the customer based upon each category using each data record of each daily interval.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    at a daily interval:
        obtaining, by a computer, raw data containing a plurality of data records associated with a customer from a plurality of databases;
        for each data record of the plurality of data records,
            determining, by the computer, an asset classification corresponding to the data record according to a classification hierarchy data structure to the data record;
            determining, by the computer, a data category indicating one or more computer-form files for a data entry of the data record based upon a preconfigured mapping between a type of data of the data entry mapped to the data category; and
            in response to detecting a new customer data requirement, updating, by the computer, the one or more computer-form files associated with each data category according to each data record of each daily interval; and
    at a preconfigured time, generating, by the computer, the one or more computer-form files based upon each data category using each data record of each daily interval.

2. The method of claim 1, wherein the classification hierarchy data structure is based on tax reporting rules, and wherein the asset classification corresponds to a taxable class of assets.

3. The method of claim 1, wherein applying the classification hierarchy data structure to the data record includes applying a decision tree corresponding to the classification hierarchy.

4. The method of claim 1, further comprising updating, by the computer, the classification hierarchy data structure based on user input.

5. The method of claim 1, wherein the classification hierarchy data structure includes a mapping of multiple asset names to a unified asset classification.

6. The method of claim 1, wherein the type of the data entry includes the asset classification of the data record.

7. The method of claim 1, wherein determining the asset classification includes applying a machine learning infrastructure on the data record.

8. The method of claim 1, wherein determining the asset classification includes identifying an origin of the data record.

9. The method of claim 1, further comprising modifying, by the computer, the one or more computer-form files using the asset classifications of each data record.

10. A computer-implemented method comprising:
at a daily interval:
- obtaining, by a computer, raw data containing a plurality of data records associated with a customer from a plurality of databases;
- detect an error in an error data record of the plurality of data records, by executing a machine learning architecture using the plurality of data records as input;
- in response to detecting the error in the error data record of the plurality of data records, automatically correcting, by the computer, executing the machine learning architecture, the error;
- for each data record of the plurality of data records, determining, by the computer, a data category indicating one or more computer-form files for a data entry of the data record based upon a preconfigured mapping between a type of data of the data entry mapped to the data category; and
- in response to detecting a new customer data requirement, updating, by the computer, the one or more computer-form files associated with each data category according to each data record of each daily interval; and at a preconfigured time, generating, by the computer, the one or more computer-form files based upon each data category using each data record of each daily interval.

11. The computer-implemented method of claim 10, wherein the machine learning architecture is trained using historical user input.

12. The computer-implemented method of claim 10, wherein the machine learning architecture obtains additional data to correct the error.

13. The computer-implemented method of claim 10, wherein the machine learning architecture presents the error and a proposed correction to a user.

14. The computer-implemented method of claim 10, further comprising applying, by the computer, the machine learning architecture on the plurality of data records to detect the new customer data requirement.

15. The computer-implemented method of claim 14, wherein the machine learning architecture detects the new customer data requirement based on an updated regulation.

16. The computer-implemented method of claim 10, wherein the machine learning architecture identifies one or more relationships between entities, wherein correcting the error is based on the one or more relationships between entities.

17. The computer-implemented method of claim 10, wherein the machine learning architecture corrects one or more computer-form file errors in the computer-form files based on a detected pattern.

18. The computer-implemented method of claim 10, wherein the machine learning architecture determines a new configuration of a computing environment, the computing environment including the computer.

19. A computer-implemented method comprising:
at a daily interval:
- obtaining, by a computer, raw data containing a plurality of data records associated with a customer from a plurality of databases;
- for each data record of the plurality of data records,
  - determining, by the computer, an asset classification corresponding to the data record by applying a machine learning infrastructure on the data record;
  - determining, by the computer, a data category indicating one or more computer-form files for a data entry of the data record based upon a preconfigured mapping between a type of data of the data entry mapped to the data category; and
  - in response to detecting a new customer data requirement, updating, by the computer, the one or more computer-form files associated with each data category according to each data record of each daily interval; and at a preconfigured time, generating, by the computer, the one or more computer-form files based upon each data category using each data record of each daily interval.

20. The method of claim 19, further comprising modifying, by the computer, the one or more computer-form files using the asset classifications of each data record.

* * * * *